US012748496B2

(12) United States Patent
Hirata et al.

(10) Patent No.: US 12,748,496 B2
(45) Date of Patent: Sep. 29, 2026

(54) AUGMENTED REALITY PRESENTATION SYSTEM

(71) Applicants: National University Corporation Tokai National Higher Education and Research System, Aichi (JP); Japan Display Inc., Tokyo (JP)

(72) Inventors: Hitoshi Hirata, Nagoya (JP); Kentaro Okuyama, Tokyo (JP); Tadatoshi Kurogi, Tokyo (JP)

(73) Assignees: National University Corporation Tokai National Higher Education and Research System, Aichi (JP); Japan Display Inc., Tokyo (JP)

( * ) Notice: Subject to any disclaimer, the term of this patent is extended or adjusted under 35 U.S.C. 154(b) by 0 days.

(21) Appl. No.: 19/252,480

(22) Filed: Jun. 27, 2025

(65) Prior Publication Data

US 2025/0328193 A1 Oct. 23, 2025

Related U.S. Application Data

(63) Continuation of application No. PCT/JP2023/046523, filed on Dec. 25, 2023.

(30) Foreign Application Priority Data

Dec. 28, 2022 (JP) ................................ 2022-211183

(51) Int. Cl.
*G06F 3/01* (2006.01)
*G02F 1/1334* (2006.01)
(Continued)

(52) U.S. Cl.
CPC .............. *G06F 3/016* (2013.01); *G06F 3/011* (2013.01); *G06T 13/40* (2013.01); *G06T 19/006* (2013.01); *G02F 1/1334* (2013.01)

(58) Field of Classification Search
CPC .......... G06F 3/016; G06F 3/011; G06T 13/40; G06T 19/006; G02F 1/1334
See application file for complete search history.

(56) References Cited

U.S. PATENT DOCUMENTS

| | | | | |
|---|---|---|---|---|
| 10,242,501 | B1 * | 3/2019 | Pusch | H04N 19/43 |
| 2010/0283728 | A1 * | 11/2010 | Hollemans | A63F 3/00643 340/407.2 |

(Continued)

FOREIGN PATENT DOCUMENTS

| | | |
|---|---|---|
| JP | 2019-096207 A | 6/2019 |
| JP | 2022-138528 A | 9/2022 |

OTHER PUBLICATIONS

International Search Report issued in related International Patent Application No. PCT/JP2023/046523, mailed on Feb. 13, 2024 and English translation of same. 5 pages.

(Continued)

*Primary Examiner* — Ariel A Balaoing
(74) *Attorney, Agent, or Firm* — K&L Gates LLP

(57) ABSTRACT

According to one embodiment, the augmented reality presentation system comprises a haptic presentation unit which presents a haptic sensation to the specific part, a display unit, an information acquiring unit for acquiring spatial position information of the specific part, an information setting unit for setting haptic information corresponding to the haptic sensation presented to the specific part, and an arithmetic processing unit for generating a specific part image that simulates the specific part.

20 Claims, 27 Drawing Sheets

(51) Int. Cl.
*G06T 13/40* (2011.01)
*G06T 19/00* (2011.01)

(56) References Cited

U.S. PATENT DOCUMENTS

| | | | | |
|---|---|---|---|---|
| 2016/0350973 | A1* | 12/2016 | Shapira | G06F 3/011 |
| 2017/0105052 | A1* | 4/2017 | DeFaria | H04N 21/816 |
| 2018/0314484 | A1* | 11/2018 | Pahud | G06F 3/1454 |
| 2022/0057864 | A1* | 2/2022 | Ito | A63F 13/54 |

OTHER PUBLICATIONS

Office Action received in related Japanese Patent Application No. 2024-567830, mailed on Jun. 2, 2026 and English translation of same. 10 pages.

* cited by examiner

AUGMENTED REALITY PRESENTATION SYSTEM

CROSS-REFERENCE TO RELATED APPLICATIONS

This application is a Continuation Application of PCT Application No. PCT/JP2023/046523, filed Dec. 25, 2023 and based upon and claiming the benefit of priority from Japanese Patent Application No. 2022-211183, filed Dec. 28, 2022, the entire contents of all of which are incorporated herein by reference.

FIELD

Embodiments described herein relate generally to an augmented reality presentation system.

BACKGROUND

In recent years, technologies for providing virtual reality (VR) and augmented reality (AR) have been focused.

In one example, a technique for improving the sense of immersion in a moving image for users watching a moving image of a character displayed on a display device is known.

There is a demand for technology that can provide users with a higher sense of reality.

DETAILED DESCRIPTION

Figure 1:
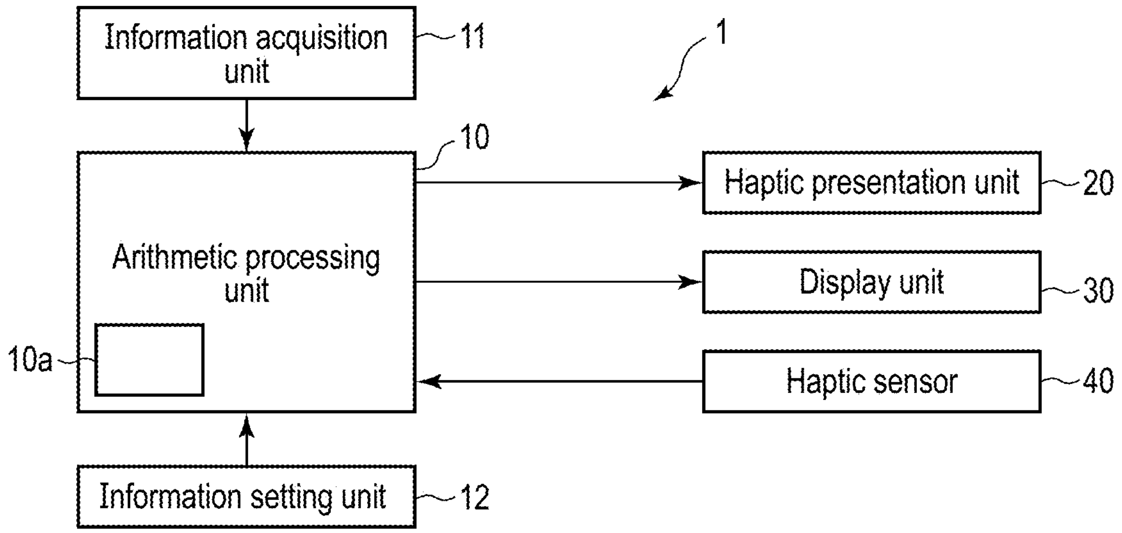
FIG. 1 is a diagram showing a configuration example of an augmented reality presentation system 1.

In general, according to one embodiment, there is provided an augmented reality presentation system comprising: a haptic presentation unit including a first haptic presentation unit mounted on a specific part of a first user, which the first user and a second user are not visible, of a body of the first user, and presenting a haptic sensation to the specific part of the first user, and a second haptic presentation unit mounted on a specific part of the second user, which the first user and the second user are visible, of a body of the second user, and presenting a haptic sensation to the specific part of the second user; a display unit provided at a position which the first user and the second user are visible; an information acquisition unit acquiring spatial position information of the specific part on which the haptic presentation unit is mounted; an information setting unit setting haptic information corresponding to the haptic sensation presented to the specific part; and an arithmetic processing unit generating a specific part image obtained by simulating the specific part, wherein the arithmetic processing unit generates a moving image of the specific part image following a movement of the specific part, based on the spatial position information acquired by the information acquisition unit, displays the moving image on the display unit, and drives the haptic presentation unit, based on the haptic information set by the information setting unit.

According to another embodiment, there is provided an augmented reality presentation system comprising: a first haptic presentation unit mounted on a first specific part of a first user and presenting a haptic sensation to the first specific part; a first shield which blocks the first specific part from a first user's field of view; a first information acquisition unit acquiring spatial position information of the first specific part; a second haptic presentation unit mounted on a second specific part of a second user and presenting a haptic sensation to the second specific part; a second shield which blocks the second specific part from a second user's field of view; a second information acquisition unit acquiring spatial position information of the second specific part; a first display unit provided at a position which the first user and the second user are visible and comprising a polymer dispersed liquid crystal panel; an information setting unit setting haptic information corresponding to a haptic sensation presented to the first specific part and the second specific part; and an arithmetic processing unit generating a specific part image obtained by simulating at least one of the first specific part and the second specific part, wherein the arithmetic processing unit generates a moving image of the specific part image following a movement of the first specific part, based on the spatial position information acquired by the first information acquisition unit, displays the moving image on the first display unit, and drives the first haptic presentation unit, based on the haptic information set by the information setting unit.

According to yet another embodiment, there is provided an augmented reality presentation system comprising: a first haptic presentation unit mounted on a first specific part of a first user and presenting a haptic sensation to the first specific part; a first shield which blocks the first specific part from a first user's field of view; a first information acquisition unit acquiring spatial position information of the first specific part; a first display unit provided at a position which the first user is visible and comprising a polymer dispersed liquid crystal panel; a first camera provided behind the first display unit and capturing the first user via the first display unit; a second haptic presentation unit mounted on a second specific part of a second user and presenting a haptic sensation to the second specific part; a second shield which blocks the second specific part from a second user's field of view; a second information acquisition unit acquiring spatial position information of the second specific part; a second display unit provided at a position which the second user is visible and comprising a polymer dispersed liquid crystal panel; a second camera provided behind the second display unit and capturing the second user via the second display unit; a first arithmetic processing unit displaying the second user captured by the second camera on the first display unit, generating a moving image of a first specific part image following a movement of the first specific part, based on the spatial position information acquired by the first information acquisition unit, and displaying the moving image on the first display unit; and a second arithmetic processing unit displaying the first user captured by the first camera on the second display unit, generating a moving image of a second specific part image following a movement of the second specific part, based on the spatial position information acquired by the second information acquisition unit, and displaying the moving image on the second display unit.

According to yet another embodiment, there is provided an augmented reality presentation device comprising: a first haptic presentation unit mounted on a first specific part of a first user and presenting a haptic sensation to the first specific part; a first shield which blocks the first specific part from a first user's field of view; a first information acquisition unit acquiring spatial position information of the first specific part; a second haptic presentation unit mounted on a second specific part of a second user and presenting a haptic sensation to the second specific part; a second shield which blocks the second specific part from a second user's field of view; a second information acquisition unit acquiring spatial position information of the second specific part; a first display unit provided at a position which the first user and the second user are visible and comprising a polymer dispersed liquid crystal panel; an information setting unit setting haptic information corresponding to a haptic sensation presented to the first specific part and the second specific part; and an arithmetic processing unit generating a specific part image obtained by simulating at least one of the first specific part and the second specific part, wherein the arithmetic processing unit generates a moving image of the specific part image following a movement of the first specific part, based on the spatial position information acquired by the first information acquisition unit, displays the moving image on the first display unit, and drives the first haptic presentation unit, based on the haptic information set by the information setting unit.

According to the embodiments, the augmented reality presentation system and the augmented reality presentation device that are capable of providing a higher sense of reality can be provided.

An embodiment will be described hereinafter with reference to the accompanying drawings.

The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a diagram showing a configuration example of an augmented reality presentation system 1.

The augmented reality presentation system 1 comprises an arithmetic processing unit 10, an information acquisition unit 11, an information setting unit 12, a haptic presentation unit 20, and a display unit 30. In the illustrated example, the augmented reality presentation system 1 further comprises a haptic sensor 40.

The haptic presentation unit 20 is attached to a specific part of the user's body that cannot be visually recognized by the user and is configured to present a haptic sensation to the specific part. In this case, the specific part is a part of the user's body, such as a finger, a hand, or a foot. The haptic presentation unit 20 comprises, for example, a sheet-shaped dielectric elastomer actuator (DEA) or the like as a vibrator. The dielectric elastomer actuator is hereinafter simply referred to as DEA. Such a haptic presentation unit 20 applies vibrations or the like based on deformation such as expansion and contraction of the DEA, to the specific part, as a desired haptic sensation.

The haptic presentation unit 20 may be formed in a belt shape and wrapped around a finger, formed in a glove shape and worn on a hand, or formed in a shoe shape and worn on a foot.

One example of a state in which the user cannot visually recognize is a state in which the user's field of vision is blocked by non-transparent goggles. Another example of a state in which the user cannot visually recognize can be achieved by applying a shield which blocks a specific part from the user's field of view. For example, a state in which a specific part is blocked from the user's field of view can be achieved by placing the specific part inside a box-shaped shield or by providing a partition between the specific part and the user's face.

The display unit 30 is provided at a position which can be visually recognized by the user. In one example, the display unit 30 is provided in goggles. In another example, the display unit 30 is configured as a stand-alone type and is provided so as to face the user.

The haptic sensor 40 is provided on, for example, a real object with which a specific part of the user comes into contact via the haptic presentation unit 20. Incidentally, the haptic sensor 40 may be omitted from the illustrated augmented reality presentation system 1.

The information acquisition unit 11 is configured to acquire spatial position information of the specific part on which the haptic presentation unit 20 is attached. For example, the information acquisition unit 11 comprises a camera capturing an image of the specific part to which the haptic presentation unit 20 is attached, a sensor which tracks the specific part, and the like. The information acquisition unit 11 continuously acquires spatial position information of the specific part, based on information obtained by the camera, the sensor, and the like, and outputs the information to the arithmetic processing unit 10.

The information setting unit 12 is configured to set haptic information corresponding to the haptic sensation to be presented to a specific part. For example, the information setting unit 12 comprises a memory which stores various parameters, formulas, algorithms, programs, and the like required to set the haptic information, and an input unit for setting the haptic sensation (for example, hard, soft, smooth, rough, and the like) to be presented to a specific part.

The arithmetic processing unit 10 is configured to drive the haptic presentation unit 20 and to display an image on the display unit 30, based on various types of information acquired by the information acquisition unit 11 and various types of information set by the information setting unit 12. In addition, the arithmetic processing unit 10 may also reflect a sensor signal obtained by the haptic sensor 40 to drive the haptic presentation unit 20.

The arithmetic processing unit 10 includes an image generation unit 10*a*, and can generate a specific part image obtained by simulating a specific part, an object image obtained by simulating a real object, and an image obtained by combining a specific part image and an object image. The object image may be a two-dimensional image or a three-dimensional image.

For example, when a specific part comes into contact with a real object via the haptic presentation unit 20, the arithmetic processing unit 10 generates a moving image of the specific part image which follows the movement of the specific part, based on the spatial position information acquired by the information acquisition unit 11, and displays the moving image on the display unit 30 (visual presentation), and drives the haptic presentation unit 20, based on the haptic information set by the information setting unit 12 (haptic presentation).

When the arithmetic processing unit 10 generates the moving image of the specific part image, the information acquisition unit 11 can detect the displacement (movement) of the specific part by continuously acquiring the spatial position information of the specific part. The arithmetic processing unit 10 generates a moving image in which the specific part image is displaced (moved), based on the spatial position information of the displaced specific part.

The arithmetic processing unit 10 can also generate a moving image in which a specific part image is displaced, based on the haptic information (for example, hard, soft, smooth, rough, or the like) set in the information setting unit 12. In other words, the arithmetic processing unit 10 controls the amount of displacement and the displacement speed (playback speed of the moving image) of the specific part image in the moving image, based on the haptic information set in the information setting unit 12. The arithmetic processing unit 10 also controls the frequency, waveform, period, amplitude, and the like of the vibration applied to the specific part by the haptic presentation unit 20, based on the haptic information set in the information setting unit 12.

In addition, as regards the movie of the image obtained by combining the specific part image and the object image, the arithmetic processing unit 10 can also generate a moving image in which the object image is deformed while the specific part image is displaced, based on the haptic information set in the information setting unit 12. In other words, the arithmetic processing unit 10 controls an amount of deformation of the object image in the moving image, in addition to the amount of displacement of the specific part image in the moving image, based on the haptic information set in the information setting unit 12.

Figure 2:
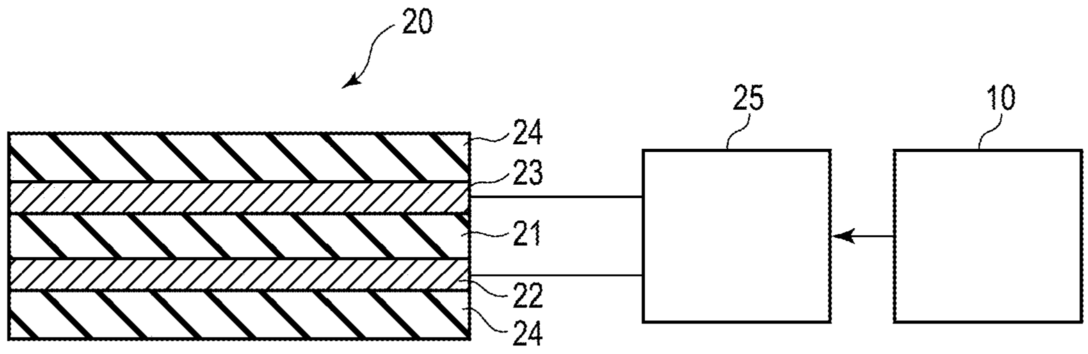
FIG. 2 is a diagram illustrating a configuration example of the haptic presentation unit 20.

FIG. 2 is a diagram illustrating a configuration example of the haptic presentation unit 20.

The DEA constituting the haptic presentation unit 20 comprises a sheet-like dielectric layer 21 formed of a dielectric elastomer, a positive electrode 22, a negative electrode 23, and a pair of insulating layers 24. The insulating layers 24, the positive electrode 22, the dielectric layer 21, the negative electrode 23, and the insulating layer 24 are stacked in this order in the thickness direction. Incidentally, a plurality of multilayer bodies of the positive electrode 22, the dielectric layer 21, and the negative electrode 23 may be stacked between the pair of insulating layers 24.

When a voltage is applied between the positive electrode 22 and the negative electrode 23, the DEA is deformed such that the dielectric layer 21 is compressed in the thickness direction and expanded in the direction along the surface of the dielectric layer 21 according to the magnitude of the applied voltage.

The dielectric elastomer constituting the dielectric layer 21 is not particularly limited, but any dielectric elastomer used in a known DEA can be used. Examples of the dielectric elastomer include, for example, cross-linked polyrotaxane, silicone elastomer, acrylic elastomer, and urethane elastomer. One of these dielectric elastomers may be used or a plurality of types may be used in combination.

The thickness of the dielectric layer 21 is, for example, 20 to 200 μm. The thickness of the positive electrode 22 and the negative electrode 23 is, for example, 0.1 to 100 μm. The thickness of the insulating layer 24 is, for example, 1 to 100 μm.

When receiving a control signal corresponding to the desired haptic sensation from the arithmetic processing unit 10, the drive device 25 applies a voltage having a frequency, a waveform, and an amplitude corresponding to the haptic sensation between the positive electrode 22 and the negative electrode 23. Accordingly, a vibration corresponding to the desired haptic sensation is applied to the user's specific part.

Embodiment 1

Figure 3:
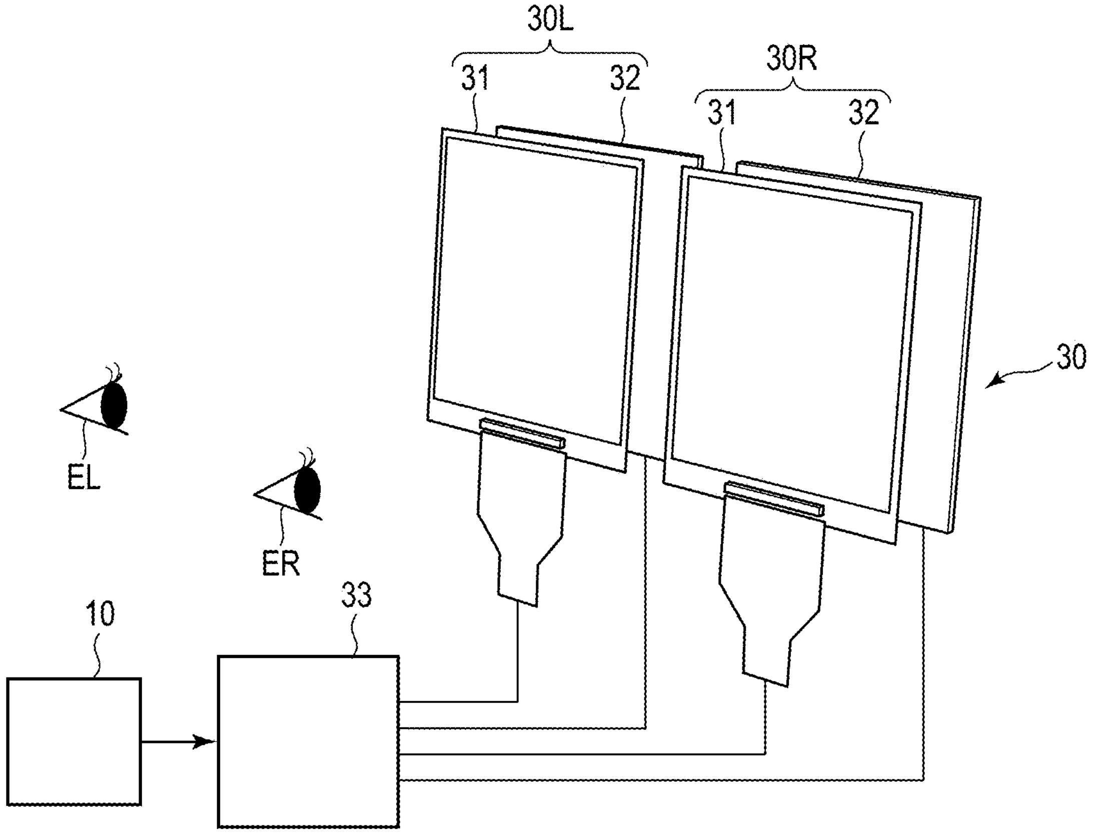
FIG. 3 is a diagram illustrating a configuration example of the display unit 30.

FIG. 3 is a diagram illustrating a configuration example of the display unit 30.

A configuration example in which the display unit 30 is provided on goggles will be described here.

In the illustrated example, a display unit 30R corresponding to a user's right eye ER and a display unit 30L corresponding to a user's left eye EL are provided as the display unit 30.

The display units 30R and 30L are configured in substantially the same manner. In other words, each of the display units 30R and 30L comprises a display panel 31 and an illumination device (backlight unit) 32. The display panel 31 is located between the right eye ER and the left eye EL and the illumination device 32. The display panel 31 is a liquid crystal panel, and is configured to display an image by selectively transmitting illumination light from the illumination device 32. Incidentally, if necessary, optical systems for guiding light transmitted through the display panel 31 to the right eye ER and the left eye EL may be provided between the display panel 31 and the right eye ER, and between the display panel 31 and the left eye EL, respectively.

The controller 33 controls the display panel 31 and the illumination device 32, based on a control signal from the arithmetic processing unit 10.

Incidentally, the display unit 30 may not be divided into the display unit 30R for the right eye and the display unit 30L for the left eye. In other words, the single display unit 30 may be provided for both the left eye EL and the right eye ER.

In addition, the display unit 30 is not limited to the combination of the liquid crystal panel and the illumination device 32. For example, the display unit 30 may comprise the display panel 31 including self-luminous elements such as organic electroluminescent (EL) elements, micro LED, or mini LED as the other display panel 31 in which the illumination device can be omitted.

Figure 4:
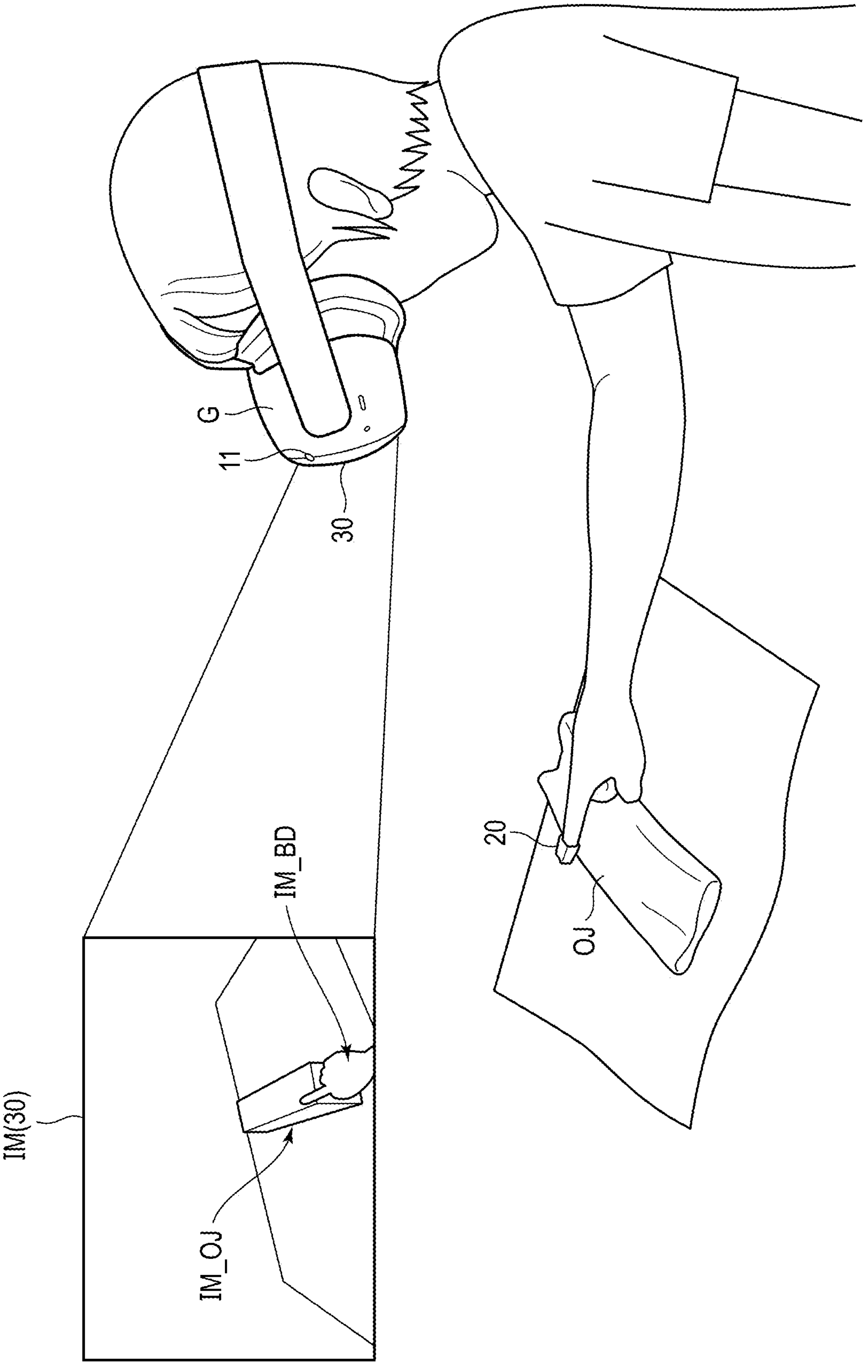
FIG. 4 is a diagram illustrating an example of use.

FIG. 4 is a diagram illustrating an example of use.

The goggles G are worn on the user's head. The haptic presentation unit 20 is worn on a finger corresponding to the specific part. The real object OJ is placed in a position which the user can touch. The information acquisition unit 11 and the display unit 30 are provided on the goggles G. Since the goggles G are non-transparent, the user cannot visually recognize his/her own finger, the haptic presentation unit 20, or the real object OJ.

In the upper left of FIG. 4, an example of an image IM displayed on the display unit 30 when the specific part (finger) comes into contact with the real object OJ via the haptic presentation unit 20 is shown. The image IM includes a specific part image IM_BD obtained by simulating the specific part, and an object image IM_OJ obtained by simulating the real object.

When the specific part moves to push the real object OJ or when the specific part moves so as to slide on the real object OJ, the image IM is displayed on the display unit 30 as a moving image in which the specific part image IM_BD is displaced to follow the movement of the specific part and in which, in some cases, the object image IM_OJ is deformed to follow the movement of the specific part.

The haptic presentation unit 20 is driven to present the desired haptic sensation in accordance with the movement of the specific part and the set haptic information, and the display unit 30 displays the image IM which is consistent with the haptic sensation. Accordingly, the user can be provided with a higher sense of reality.

Incidentally, the real object OJ used in this system is desirably deformable elastically. The haptic sensation providing unit 20 mainly stimulates a skin of the specific part, whereas the real object OJ mainly stimulates muscles of the specific part. Accordingly, it is possible to provide a higher sense of reality compared to that in a case where the real object OJ does not exist.

Several specific modes realized by the present system will be described below.

Figure 5:
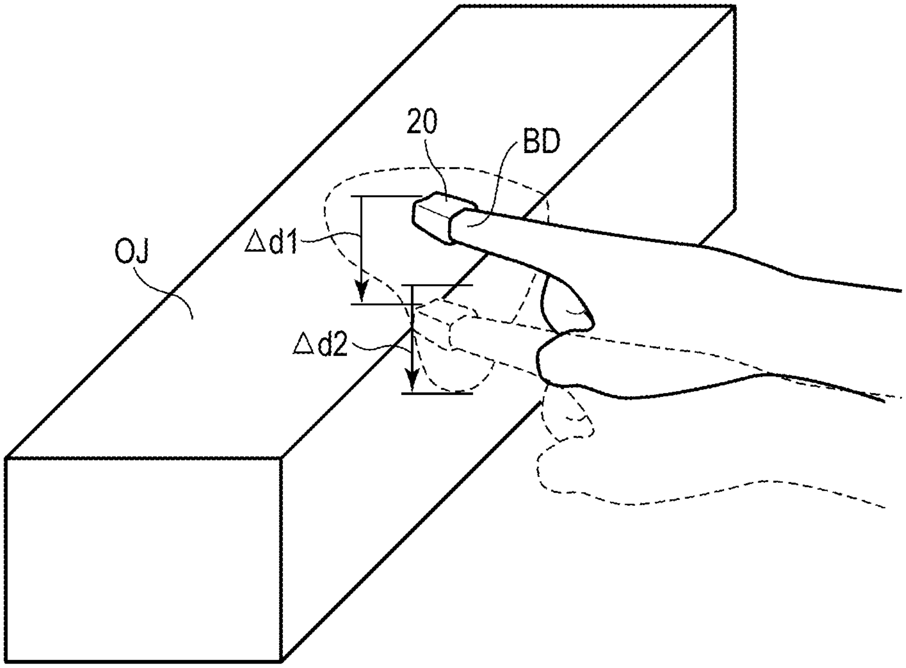
FIG. 5 is a diagram showing the specific part BD and the real object OJ in the first mode for presenting a hard haptic sensation and the second mode for presenting a soft haptic sensation.

FIG. 5 is a diagram showing the specific part BD and the real object OJ in the first mode for presenting a hard haptic sensation and the second mode for presenting a soft haptic sensation.

In the figure, a state in which the specific part BD is in contact with the real object OJ via the haptic presentation unit 20 is indicated by a solid line, and a state in which the specific part BD presses the real object OJ is indicated by a dotted line. The amount of displacement when the specific part BD is displaced in the thickness direction (normal direction) of the real object OJ is denoted by Δd1, and the amount of deformation when the real object OJ is deformed in the thickness direction is denoted by Δd2.

The frequency, the waveform, and the amplitude of the vibration which the haptic presentation unit 20 applies to the specific part in the first mode are different from those in the second mode.

Figure 6:
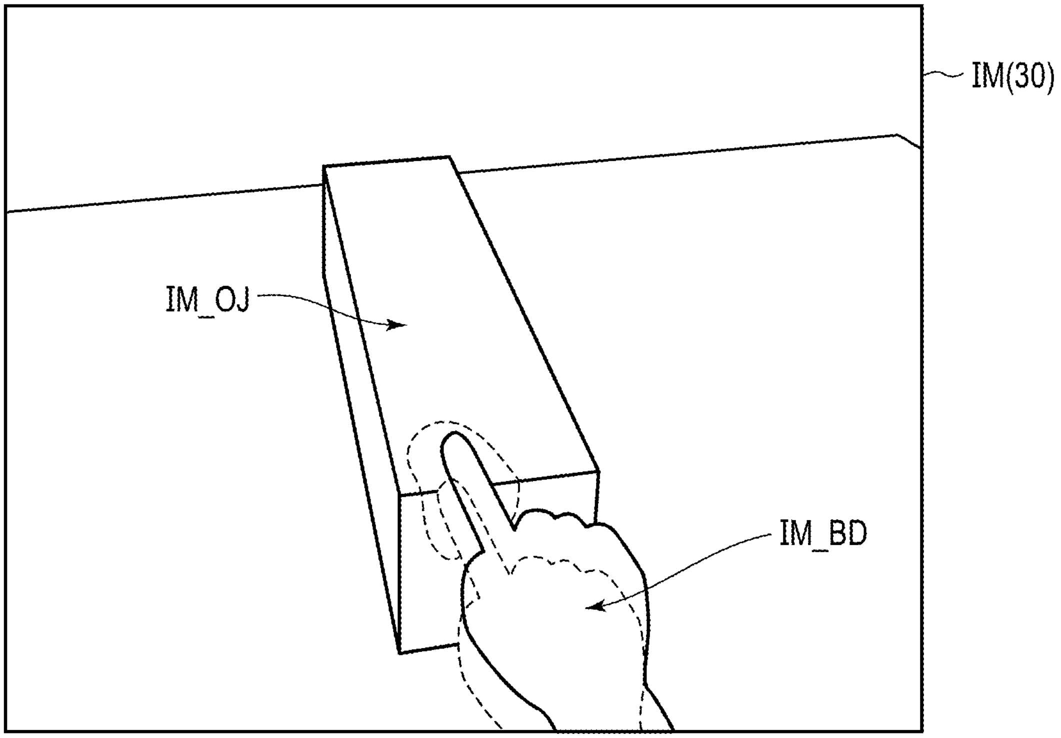
FIG. 6 is a diagram showing the image IM displayed on the display unit 30 in the first mode and the second mode.

FIG. 6 is a diagram showing the image IM displayed on the display unit 30 in the first mode and the second mode.

In the first mode, the specific part image IM_BD hardly sinks into the object image IM_OJ. The amount of displacement of the specific part image IM_BD displayed as the moving image is different from the amount of displacement Δd1 of the actual specific part BD shown in FIG. 5. In addition, the amount of deformation of the object image IM_OJ is different from the amount of deformation Δd2 of the real object OJ shown in FIG. 5.

In the second mode, the specific part image IM_BD sinks into the object image IM_OJ. The amount of displacement of the specific part image IM_BD displayed as the moving image is different from the amount of displacement Δd1 of the actual specific part BD shown in FIG. 5. In addition, the amount of deformation of the object image IM_OJ is different from the amount of deformation Δd2 of the real object OJ shown in FIG. 5.

In a case where the specific part BD is displaced by a constant amount of displacement Δd1, when the amount of displacement of the specific part image IM_BD in the first mode is compared with that in the second mode, the amount of displacement of the specific part image IM_BD in the first mode is smaller than the displacement amount of the specific part image in the second mode.

In a case where the real object OJ is deformed by a constant amount of deformation Δd2, when the amount of deformation of the object image IM_OJ in the first mode is compared with that in the second mode, the amount of deformation of the object image IM_OJ in the first mode is smaller than the amount of deformation of the object image IM_OJ in the second mode.

An example of the first mode and the second mode will be described below.

As a premise for the first mode (hard haptic sensation), it is assumed that the amount of displacement Δd1 by which the specific part BD sinks into the real object OJ is 10 mm and that the movement speed of the specific part BD is 100 mm/s.

The display unit 30 displays the image (moving image) IM in which the specific part image IM_BD is displaced in accordance with the movement of the specific part BD. The amount of displacement of the specific part image IM_BD sinking into the object image IM_OJ is 1 mm and the playback speed is twice the speed.

The haptic presentation unit 20 applies vibration to the specific part BD in accordance with the movement of the specific part BD (or in accordance with the displayed image IM). The frequency of the vibration applied to the specific part BD is 100 Hz, the waveform is a square wave, and the period is half a cycle.

As a premise for the second mode (soft haptic sensation), it is assumed that the amount of displacement Δd1 by which the specific part BD sinks into the real object OJ is 10 mm and that the movement speed of the specific part BD is 10 mm/s.

The display unit 30 displays the image (moving image) IM in which the specific part image IM_BD is displaced in accordance with the movement of the specific part BD. The amount of displacement of the specific part image IM_BD sinking into the object image IM_OJ is 20 mm, and the playback speed is 0.5 times faster.

The haptic presentation unit 20 applies vibration to the specific part BD in accordance with the movement of the specific part BD (or in accordance with the displayed image IM). The frequency of the vibration applied to the specific part BD is 5 Hz, the waveform is a sine wave, and the period is half a cycle. When the amplitude of the vibration in the first mode is 100%, the amplitude of the vibration in the second mode is 50%.

The amount of displacement of the specific part image IM_BD is set to m times the amount of displacement Δd1 of the specific part BD, and the parameter m is set according to the hardness to be presented. For example, the parameter m is set to be smaller (m=0.1 in the above example) if the haptic sensation is hard, and the parameter m is set to be larger (m=2 in the above example) if the haptic sensation is soft.

The frequency and waveform are set according to the hardness to be presented. For example, the frequency is set to be higher (100 Hz square wave in the above example) if the haptic sensation is hard, and the frequency is set to be lower (5 Hz sine wave in the above example) if the haptic sensation is soft.

The period is set according to the object image IM_OJ to be displayed. For example, the period is set to half a cycle if the object image IM_OJ is a rigid body, and the period is set to 10 cycles if the object image IM_OJ is a fluid.

The playback speed and the amplitude are set mainly according to the relative speed (acceleration) between the specific part BD and the real object OJ. For example, if the relative speed is fast, the playback speed is set to be faster (twice as fast in the above example) and the amplitude is set to be larger (100% in the above example). If the relative speed is slow, the playback speed is set to be slower (0.5 times as fast in the above example) and the amplitude is set to be smaller (50% in the above example).

Figure 7:
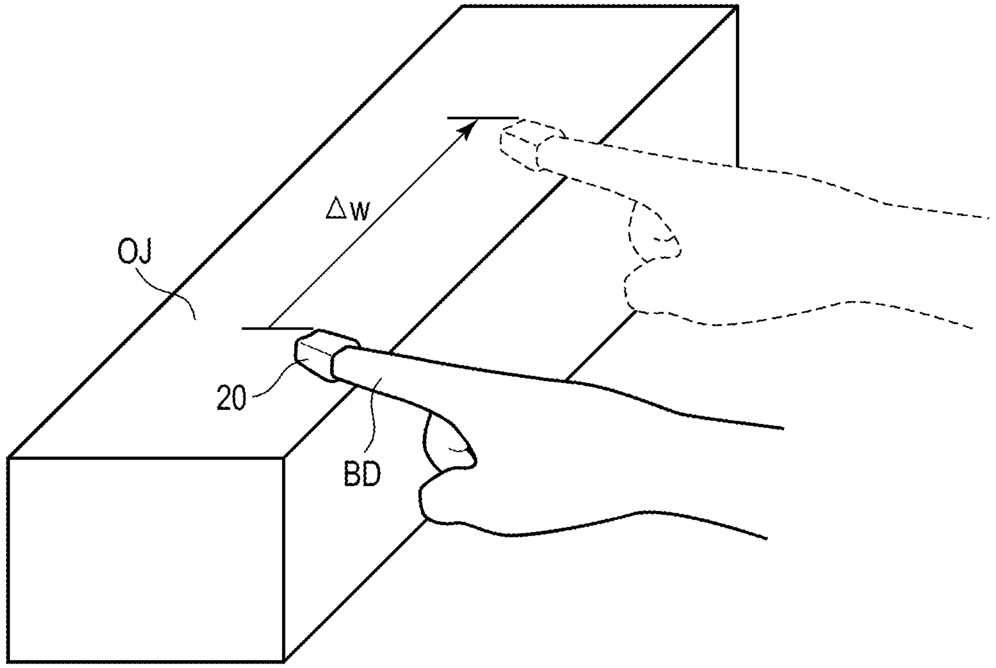
FIG. 7 is a diagram showing the specific part BD and the real object OJ in the third mode for presenting a smooth haptic sensation and the fourth mode for presenting a rough haptic sensation.

FIG. 7 is a diagram showing the specific part BD and the real object OJ in the third mode for presenting a smooth haptic sensation and the fourth mode for presenting a rough haptic sensation.

In the figure, a state in which the specific part BD is in contact with the real object OJ via the haptic presentation unit 20 is indicated by a solid line, and a state in which the specific part BD slides while being in contact with the real object OJ is indicated by a dotted line. The amount of displacement when the specific part BD is displaced in the in-plane direction of the real object OJ is denoted as Δw.

The frequency, the waveform, and the amplitude of the vibration that the haptic presentation unit 20 applies to the specific part in the third mode are different from those in the fourth mode.

Figure 8:
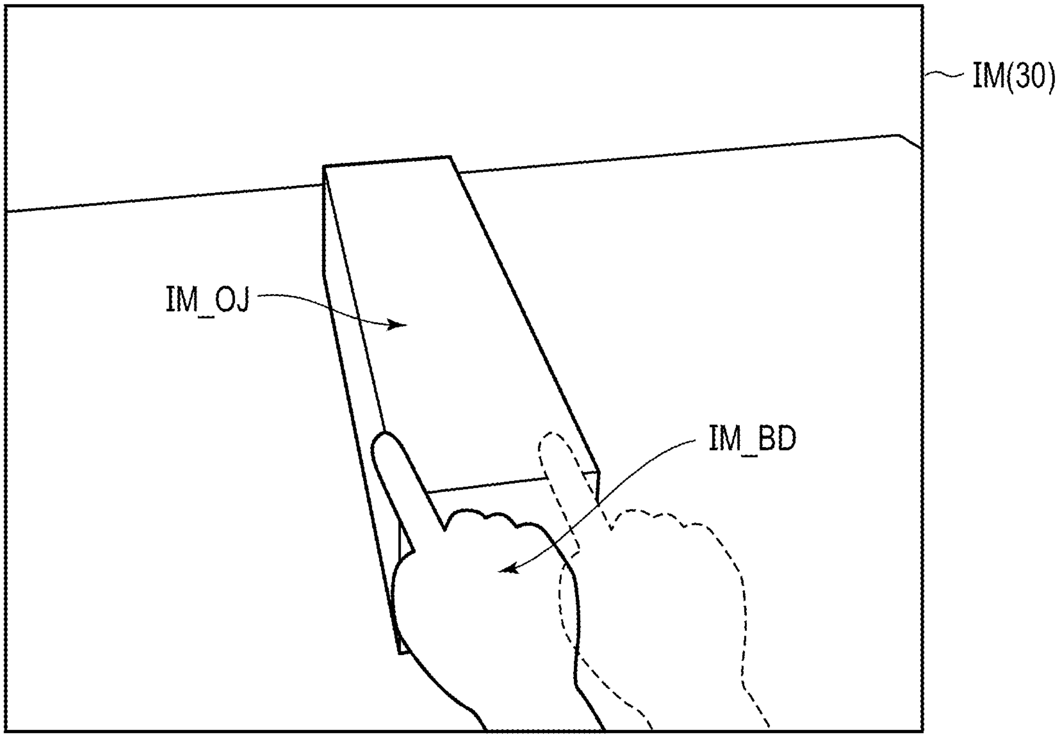
FIG. 8 is a diagram showing the image IM displayed on the display unit 30 in the third mode and the fourth mode.

FIG. 8 is a diagram showing the image IM displayed on the display unit 30 in the third mode and the fourth mode.

In the third mode, the specific part image IM_BD is displaced in a short time relative to the object image IM_OJ (displaced with small friction). The amount of displacement of the specific part image IM_BD displayed as a moving image is different from the amount of displacement Δw of the actual specific part BD shown in FIG. 7.

In the fourth mode, the specific part image IM_BD is displaced slowly over a long period of time relative to the object image IM_OJ (displaced with large friction). The amount of displacement of the specific part image IM_BD displayed as a moving image is different from the amount of displacement Δw of the actual specific part BD shown in FIG. 7.

In a case where the specific part BD is displaced by a constant amount of displacement Δw, when the amount of displacement of the specific part image IM_BD in the third mode is compared with that in the fourth mode, the amount of displacement of the specific part image IM_BD in the first mode is greater than the displacement amount of the specific part image in the fourth mode.

The surface pattern of the object image IM_OJ is desirably different depending on the mode to be set. For example, in the third mode, the surface pattern of the object image IM_OJ is displayed to have a glossy appearance. In addition, in the fourth mode, the surface pattern of the object image IM_OJ is displayed to have a matte appearance.

An example of the third mode and the fourth mode will be described below.

As a premise for the third mode (smooth haptic sensation), it is assumed that the amount of displacement Δw of the specific part BD sliding on the real object OJ is 10 mm and that the movement speed of the specific part BD is 100 mm/s.

The display unit 30 displays the image (moving image) IM in which the specific part image IM_BD is displaced in accordance with the movement of the specific part BD. The amount of displacement of the specific part image IM_BD sliding on the object image IM_OJ is 20 mm, and the playback speed is twice the speed.

The haptic presentation unit 20 applies vibration to the specific part BD in accordance with the movement of the specific part BD (or in accordance with the displayed image IM). The frequency of the vibration applied to the specific part BD is 500 Hz, the waveform is a sine wave, and the period is the time when it takes for the specific part BD to slide on the real object OJ.

As a premise for the fourth mode (rough haptic sensation), it is assumed that the amount of displacement Δw of the specific part BD sliding on the real object OJ is 10 mm and that the movement speed of the specific part BD is 10 mm/s.

The display unit 30 displays the image (moving image) IM in which the specific part image IM_BD is displaced in accordance with the movement of the specific part BD. The amount of displacement of the specific part image IM_BD sliding on the object image IM_OJ is 2 mm, and the playback speed is 0.5 times the speed.

The haptic presentation unit 20 applies vibration to the specific part BD in accordance with the movement of the specific part BD (or in accordance with the displayed image IM). The frequency of the vibration applied to the specific part BD is 10 to 300 Hz, the waveform is a composite waveform, and the period is the time during which the specific part BD slides on the real object OJ. When the amplitude of the vibration in the third mode is 100%, the amplitude of the vibration in the fourth mode is 50%.

The amount of displacement of the specific part image IM_BD is set to n times the amount of displacement Δw of the specific part BD, and the parameter n is set according to the smoothness (or the amount of friction) of the object to be presented. For example, the parameter n is set to be larger (n=2 in the above example) if the object is smooth and has low friction, and the parameter n is set to be smaller (n=0.5 in the above example) if the object is rough and has high friction.

The frequency and the waveform are set according to the smoothness (or amount of friction) of the object to be presented. For example, the frequency is set to be higher (500 Hz sine wave in the above example) if the object is smooth and has low friction, and the frequency is set to be lower (a complex waveform of 10 to 300 Hz in the above example) if the object is rough and has high friction.

The playback speed and the amplitude are set mainly according to the relative speed (acceleration) between the specific part BD and the real object OJ. For example, if the relative speed is fast, the playback speed is set to be faster (twice as fast in the above example) and the amplitude is set to be larger (100% in the above example). If the relative speed is slow, the playback speed is set to be slower (0.5 times as fast in the above example) and the amplitude is set to be smaller (50% in the above example).

Embodiment 2

Figure 9:
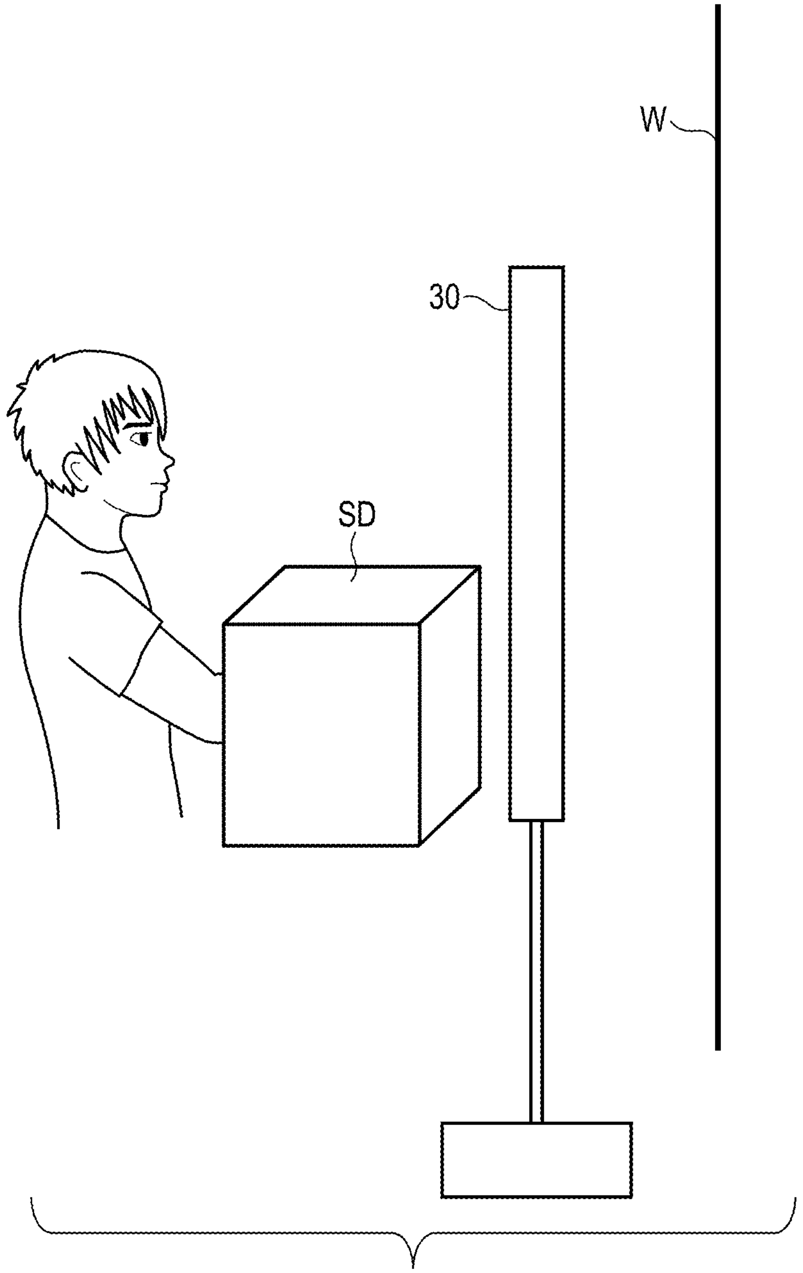
FIG. 9 is a diagram showing an outline of an augmented reality presentation system comprising a stand-alone display unit 30.

FIG. 9 is a diagram showing an outline of an augmented reality presentation system comprising a stand-alone display unit 30.

The display unit 30 is located between a wall W and a user. A specific part of the user is inserted into a shield SD. A real object OJ is provided inside the shield SD as described later.

In the example shown in FIG. 9, the position where the shield SD is provided is not particularly limited. Therefore, the user can touch the real object OJ inside the shield SD in a natural posture while forming a state in which the user cannot visually recognize the specific part.

As another example, the shield SD may be provided so as to overlap with the display unit 30.

Figure 10:
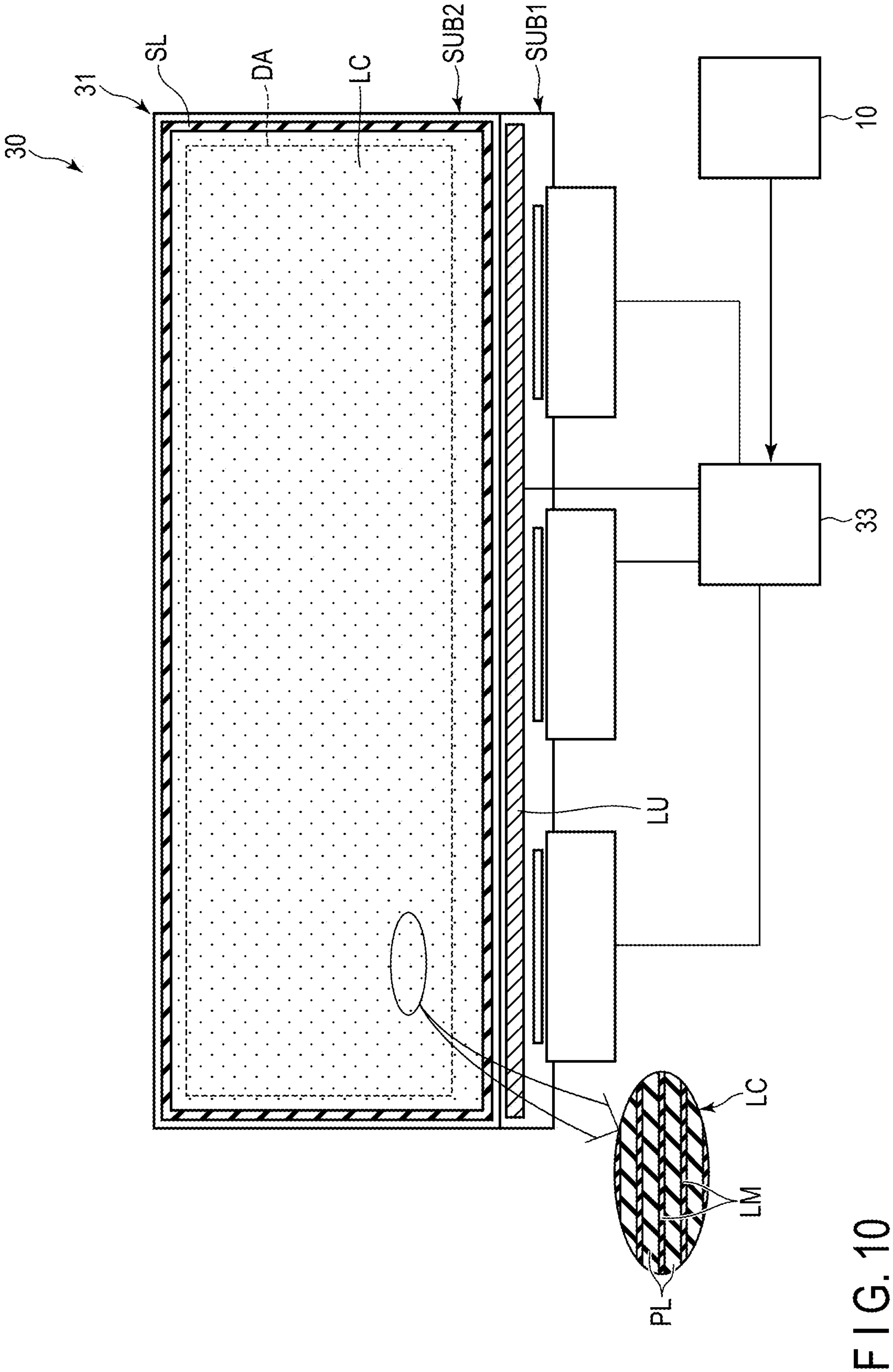
FIG. 10 is a diagram showing a configuration example of the display unit 30.

FIG. 10 is a diagram showing a configuration example of the display unit 30.

The display unit 30 comprises a display panel 31 and a light source unit LU.

The display panel 31 is a polymer dispersed liquid crystal panel. In other words, the display panel 31 comprises a first substrate SUB1, a second substrate SUB2 facing the first substrate SUB1, and a liquid crystal layer LC containing polymer dispersed liquid crystal held between the first substrate SUB1 and the second substrate SUB2.

The first substrate SUB1 and the second substrate SUB2 are bonded to each other with a seal SL, thereby sealing the liquid crystal layer LC. The seal SL is formed in a frame-like shape surrounding a display area DA where images are displayed.

In the display area DA, a plurality of pixels are arranged in a matrix pattern. In each pixel, a pair of transparent electrodes are provided with a liquid crystal layer LC in between. For example, one of the transparent electrodes is a pixel electrode electrically connected via the switching element of each pixel, and the other transparent electrode is a common electrode provided across a plurality of pixels.

Unlike the backlight unit, the light source unit LU is configured to overlap with the first substrate SUB1, to be provided along the side surface of the second substrate SUB2, and to emit illumination light toward the second substrate SUB2. The light source unit LU comprises, for example, red light-emitting elements, green light-emitting elements, and blue light-emitting elements, and is configured such that each light-emitting element is sequentially turned on.

The controller 33 controls the display panel 31 and the light source unit LU, based on control signals from the arithmetic processing unit 10.

As shown in an enlarged schematic view in FIG. 10, the liquid crystal layer LC includes a polymer PL and liquid crystal molecules LM. In one example, the polymer PL is a liquid crystalline polymer. The polymer PL is formed in stripes extending in one direction. The liquid crystal molecules LM are dispersed in the gaps between the polymer PL and are initially aligned such that their long axes are aligned along the direction of extension of the polymer PL. Each of the polymer PL and the liquid crystal molecules LM has optical anisotropy or refractive index anisotropy. The response of the polymer PL to an electric field is lower than the response of the liquid crystal molecules LM to an electric field.

In one example, the orientation direction of the polymer PL hardly changes regardless of the presence or absence of an electric field. In contrast, the alignment direction of the liquid crystal molecules LM changes in response to the electric field in a state in which a voltage higher than or equal to a threshold value is applied to the liquid crystal layer LC.

When no voltage is applied to the liquid crystal layer LC (initial alignment state), the optical axes of the polymer PL and the liquid crystal molecules LM are nearly parallel to each other. In this case, the illumination light emitted from the light source unit LU propagates inside the display panel 31, and the light reaching the liquid crystal layer LC of a pixel to which no voltage is applied passes through the liquid crystal layer LC (transparent state). At this time, a user observing the display panel 31 can visually recognize the background of the display panel 31 through the area where the transparent pixels are provided.

When a voltage is applied to the liquid crystal layer LC, the alignment direction of the liquid crystal molecules LM changes, and the optical axes of the polymer PL and the liquid crystal molecules LM intersect with each other. In this case, the illumination light emitted from the light source unit LU propagates inside the display panel 31, and the light reaching the liquid crystal layer LC of the pixel to which voltage is applied is scattered by the liquid crystal layer LC (scattered state). A display image is formed according to the degree of light scattering in the liquid crystal layer LC. In other words, the user observing the display panel 31 can visually recognize the image in the area where pixels in the scattered state are provided.

Figure 11:
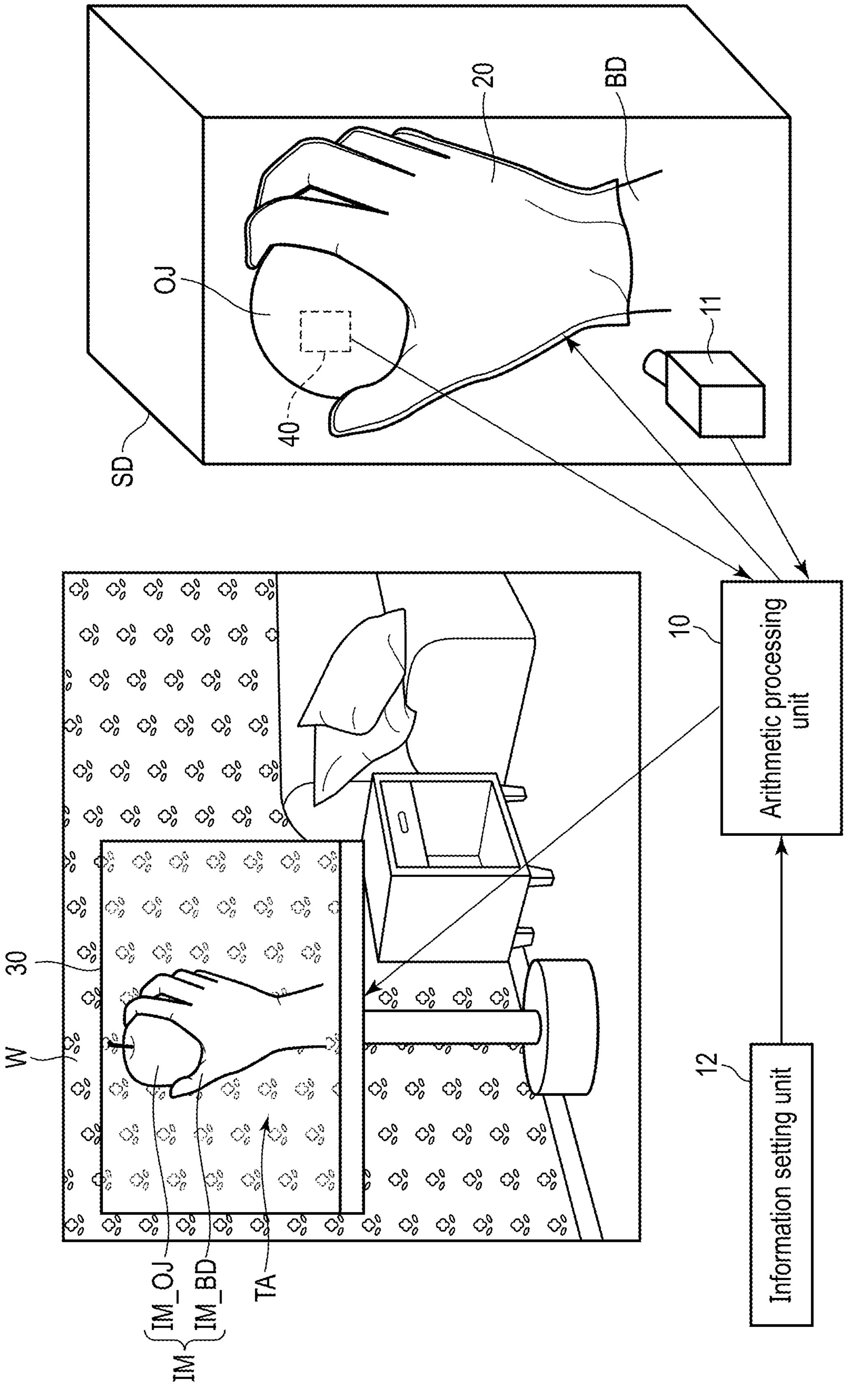
FIG. 11 is a diagram illustrating an example of use.

FIG. 11 is a diagram illustrating an example of use.

In the illustrated example, the user's right hand corresponds to the specific part BD. The haptic presentation unit 20 is formed in a glove-like shape and is attached to the specific part BD.

The real object OJ is located inside a box-shaped shield SD and is not fixed. The real object OJ can be freely moved and deformed inside the shield SD. The shape of the real object OJ is, for example, spherical, but may not be any particular shape.

The user inserts the specific part BD to which the haptic presentation unit 20 is attached into the shield SD and grasps the real object OJ. The user cannot visually recognize his/her own specific part BD, the haptic presentation unit 20, or the real object OJ.

The information acquisition unit 11 is provided inside the shield SD, captures an image of the specific part BD grasping the real object OJ via the haptic presentation unit 20, acquires spatial position information of the specific part BD, and outputs the information to the arithmetic processing unit 10.

In the illustrated example, the real object OJ incorporates a haptic sensor 40. The haptic sensor 40 outputs sensor signals corresponding to a grip strength of a specific part BD grasping the real object OJ, and the like, to the arithmetic processing unit 10. If the real object OJ is formed of a material which is hardly deformed, the haptic sensor 40 may not be built in the real object OJ, but may be provided on the surface of the real object OJ.

In the upper left of FIG. 11, an example of an image IM displayed on the display unit 30 when the specific part BD grasps the real object OJ via the haptic presentation unit 20 is shown. The image IM includes a specific part image IM_BD obtained by simulating the specific part BD, and an object image IM_OJ obtained by simulating the real object OJ. The object image IM_OJ, unlike the real object OJ, is an image of an apple in the illustrated example. Incidentally, the image information to be displayed as the object image IM_OJ is stored in, for example, the memory of the information setting unit 12. Therefore, by storing image information corresponding to a plurality of types of object images IM_OJ in advance in the memory, the image generation unit 10*a* built in the arithmetic processing unit 10 can generate various object images IM_OJ, based on the selected image information. In other words, not only the apple shown in the figure, but various images can be selected and displayed on the display unit 30 as the object image IM_OJ.

When the specific part BD moves while grasping the real object OJ, the image IM is displayed on the display unit 30 as a moving image in which the specific part image IM_BD and the object image IM_OJ are displaced to follow the movement of the specific part BD.

In addition, the display unit 30 comprises a polymer dispersed liquid crystal panel as described with reference to FIG. 10. The display unit 30 sets the area where the object image IM_OJ and the specific part image IM_BD are displayed to a scattering state, and sets the area TA surrounding the object image IM_OJ and the specific part image IM_BD to a transparent state. Accordingly, the wall W located behind the display unit 30 can be visually recognized in the area TA.

At this time, the haptic presentation unit 20 is driven to present the desired haptic sensation in accordance with the haptic information of the object image IM_OJ displayed on the display unit 30 and the movement of the specific part BD.

While observing the object image IM_OJ and the specific part image IM_BD displayed on the display unit 30, the user can simultaneously observe the background of the display unit 30 in the area TA surrounding these images IM. Therefore, the user can observe the specific part image IM_BD of the object image (an apple in the illustrated example) IM_OJ as if it floated in place, the fusion of the displayed information with the reality is promoted, and the user can obtain the sensation as if the user grasped an apple in his/her own hand. In addition, the user is freed from inconvenience of having to wear the goggles.

Accordingly, the user can be provided with a higher sense of reality.

Furthermore, a plurality of users can simultaneously observe a single display unit 30. Methods of use such as sharing of information and collaborative work can also be therefore realized.

Incidentally, as another example, the image IM including the object image IM_OJ and the specific part image IM_BD may show a scene of shaking hands with a virtual person or a scene of shaking hands with a person in a remote location. At this time, the haptic presentation unit 20 provides the specific part BD with the haptic sensation of shaking hands, such that the user can obtain the sensation of shaking hands with a virtual person or a person in a remote location. Alternatively, an image of a virtual space may be displayed in the area TA surrounding the image IM.

Alternatively, a part of the image IM may be augmented. For example, by applying the augmentation processing to the specific part image IM_BD, the user can be provided with an experience of unrealistic changes to the body such as duplicating the user's specific part, cutting out the specific part, freely changing the length of the specific part, bending the specific part beyond the range of joint motion, inverting the specific part, or replacing the specific part with another object. Furthermore, by applying the augmentation processing to the object image IM_OJ, the user can be provided with an experience of object changes.

In the example shown in FIG. 11, a technique of replacing the actual object OJ located inside the shield SD with a pseudo another object image IM_OJ has been described. However, the present invention is not limited to this example.

For example, by installing an augmented reality presentation system similar to that shown in FIG. 11 in a remote location and connecting a plurality of augmented reality presentation systems via a communication line, the systems can be used as a communication tool. At this time, a situation in which one user holds out a hand and shakes hands with the other user is displayed on the display unit 30 as the image IM. At the same time, when one user grasps the real object OJ inside the shield SD, the haptic sensor 40 built into the real object OJ detects the haptic sensation, and this detection result is reflected on the haptic presentation unit 20 on the other user's side. While observing the object image IM_OJ and the specific part image IM_BD displayed on the display unit 30, the user can also observe the background of the display unit 30 at the same time since the peripheries of these images are transparent. As a result, the user can obtain the sensation as if the user shook hands with the counterpart at its location. These will be described below as other embodiments.

Embodiment 3

Figure 12:
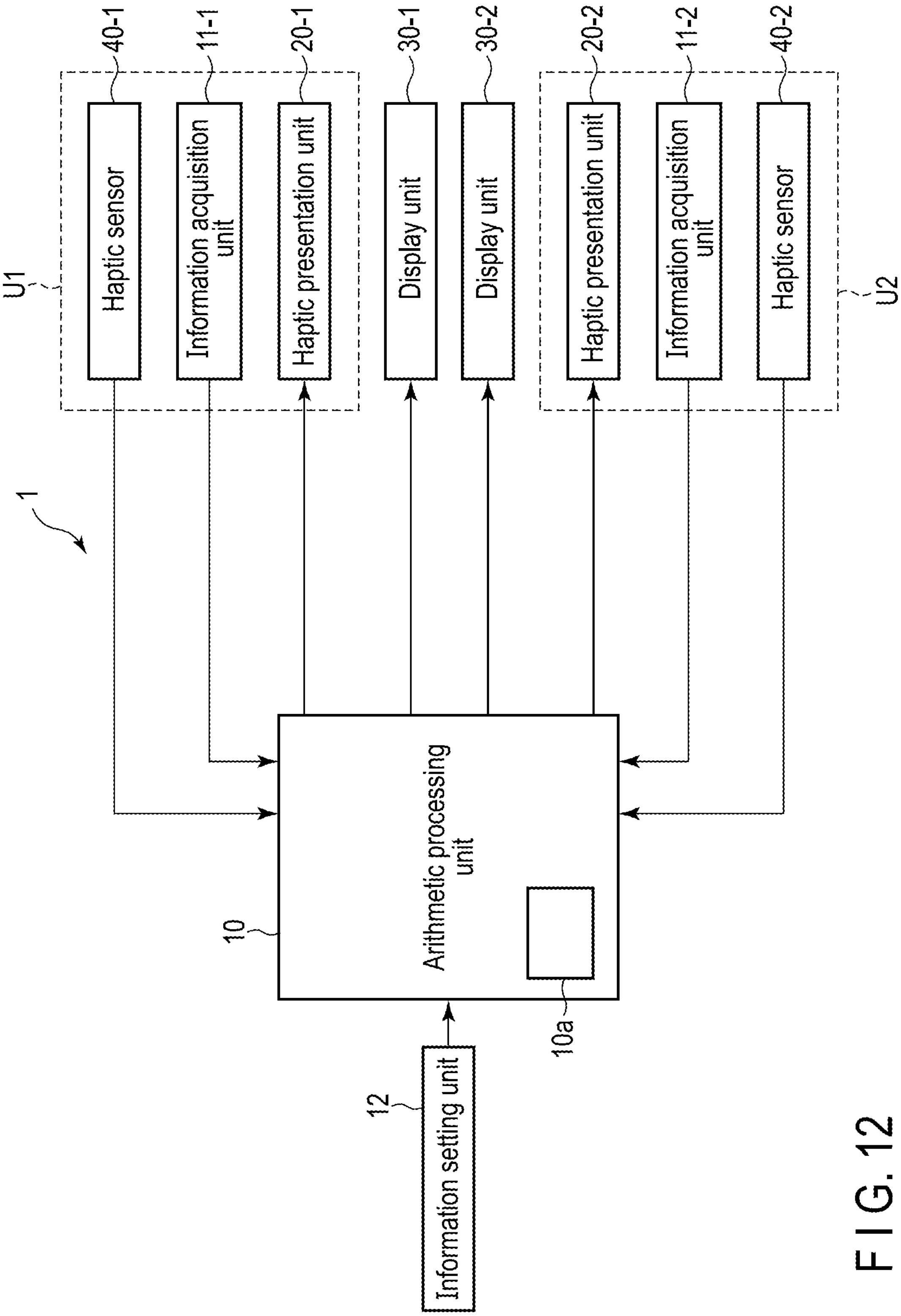
FIG. 12 is a diagram showing another configuration example of an augmented reality presentation system 1.

FIG. 12 is a diagram showing another configuration example of an augmented reality presentation system 1.

The augmented reality presentation system 1 comprises an arithmetic processing unit 10, information acquisition units 11-1 and 11-2, an information setting unit 12, haptic presentation units 20-1 and 20-2, and a display unit 30-1. In the illustrated example, the augmented reality presentation system 1 further comprises haptic sensors 40-1 and 40-2 and a display unit 30-2. The haptic sensors 40-1 and 40-2 and the display unit 30-2 may be omitted. In addition, three or more display units 30 may be provided. Details of each unit have been described above. As described above, the display units 30-1 and 30-2 comprise polymer dispersed liquid crystal panels.

The information acquisition unit 11-1, the haptic presentation unit 20-1, and the haptic sensor 40-1 are provided in correspondence with one user U1. The information acquisition unit 11-2, the haptic presentation unit 20-2, and the haptic sensor 40-2 are provided in correspondence with the other user U2.

The display unit 30-1 can be shared by the user U1 and the user U2. For example, the display unit 30-1 is provided between the user U1 and the user U2 facing each other. In this case, the user U1 can observe the user U2 while observing the display unit 30-1 from one surface side. In addition, the user U2 can observe the user U1 while observing the display unit 30-1 from the other surface side.

The display unit 30-1 may also be provided so as to face a plurality of users U1 and U2 arranged side by side. In this case, the users U1 and U2 can simultaneously observe the display unit 30-1 from one side.

The plurality of display units 30-1 and 30-2 can be shared by the user U1 and the user U2. For example, the display units 30-1 and 30-2 are provided between the user U1 and the user U2 facing each other, in an overlapping state. In this case, the user U1 can observe the user U2 while observing the display units 30-1 and 30-2 from one surface side. The user U2 can also observe the user U1 while observing the display units 30-1 and 30-2 from the other surface side. At this time, different images or the same image may be displayed on each of the display units 30-1 and 30-2. Alternatively, the image on the display unit 30-1 may be displayed so as not to overlap with the image on the display unit 30-2 or may be displayed so as to overlap with the image on the display unit 30-2.

Alternatively, the display unit 30-1 may be provided in correspondence with the user U1, and the display unit 30-2 may be provided in correspondence with the user U2. At this time, the display unit 30-1 may be provided in a different space (remote location) from the display unit 30-2 or may be provided in the same space as the display unit 30-2.

In such a configuration example, for example, the user U1 corresponds to a first user, the specific part of the user U1 corresponds to a first specific part, the user U2 corresponds to a second user, and the specific part of user U2 corresponds to a second specific part. The information acquisition unit 11-1 corresponds to a first information acquisition unit, and the information acquisition unit 11-2 corresponds to a second information acquisition unit. The haptic presentation unit 20-1 corresponds to a first haptic presentation unit, and the haptic presentation unit 20-2 corresponds to a second haptic presentation unit. The display unit 30-1 corresponds to a first display unit, and the display unit 30-2 corresponds to a second display unit.

Figure 13:
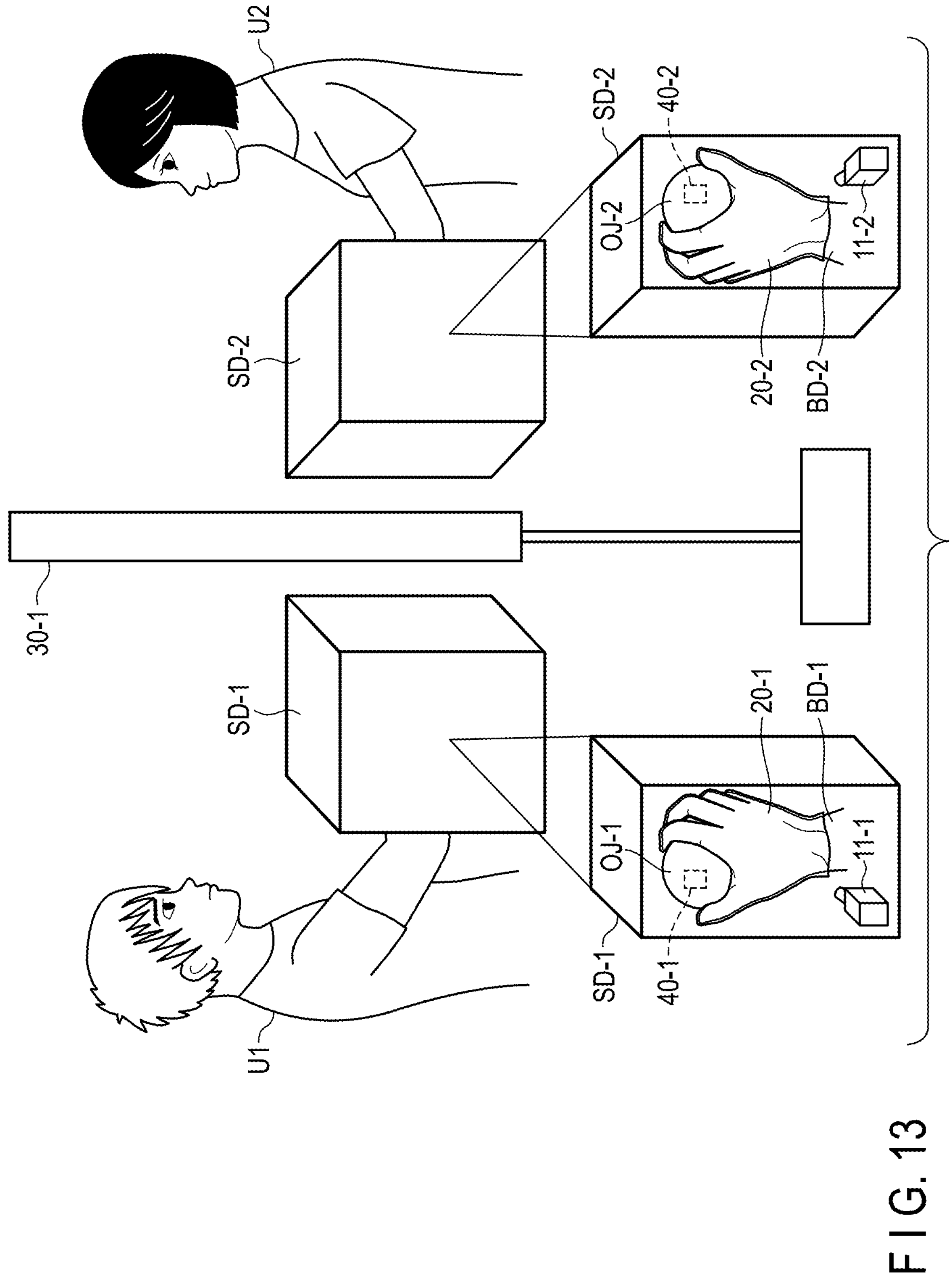
FIG. 13 is a diagram illustrating an example of use.

FIG. 13 is a diagram illustrating an example of use.

In the illustrated example, the user U1 and the user U2 face each other. The display unit 30-1 is provided between the user U1 and the user U2.

First, the system corresponding to the user U1 will be described. In this example, a right hand of the user U1 corresponds to a specific part BD-1. The haptic presentation unit 20-1 is formed in a glove-like shape and is attached to the specific part BD-1.

The real object OJ-1 is located inside a box-shaped shield (first shield) SD-1 and is not fixed. The real object OJ-1 can be freely moved and deformed inside the shield SD-1.

The user U1 inserts the specific part BD-1 to which the haptic presentation unit 20-1 is attached into the shield SD-1 and grasps the real object OJ-1. The user U1 cannot visually recognize his/her own specific part BD-1, the haptic presentation unit 20-1, or the real object OJ-1.

The information acquisition unit 11-1 is provided inside the shield SD-1, captures the specific part BD-1 grasping the real object OJ-1 via the haptic presentation unit 20, acquires spatial position information of the specific part BD-1, and outputs the information to the arithmetic processing unit 10.

In the illustrated example, the real object OJ-1 incorporates a haptic sensor 40-1. The haptic sensor 40-1 outputs sensor signals corresponding to a grip strength of a specific part BD-1 grasping the real object OJ-1, and the like, to the arithmetic processing unit 10. If the real object OJ-1 is formed of a material which is hardly deformed, the haptic sensor 40-1 may not be built in the real object OJ-1, but may be provided on the surface of the real object OJ-1.

Next, the system corresponding to the user U2 will be described. A left hand of the user U2 corresponds to a specific part BD-2. In other words, in the example of use shown here, the specific part BD-1 of the user U1 and the specific part BD-2 of the user U2 are hands on different sides. The haptic presentation unit 20-2 is formed in a glove-like shape and is attached to the specific part BD-2.

The real object OJ-2 is located inside a box-shaped shield (second shield) SD-2 and is not fixed. The real object OJ-2 can be freely moved and deformed inside the shield SD-2.

The user U2 inserts the specific part BD-2 to which the haptic presentation unit 20-2 is attached into the shield SD-2 and grasps the real object OJ-2. The user U2 cannot visually recognize his/her own specific part BD-2, the haptic presentation unit 20-2, or the real object OJ-2.

The information acquisition unit 11-2 is provided inside the shield SD-2, captures the specific part BD-2 grasping the real object OJ-2 via the haptic presentation unit 20, acquires spatial position information of the specific part BD-2, and outputs the information to the arithmetic processing unit 10.

In the illustrated example, the real object OJ-2 incorporates a haptic sensor 40-2. The haptic sensor 40-2 outputs sensor signals corresponding to a grip strength of a specific part BD-2 grasping the real object OJ-2, and the like, to the arithmetic processing unit 10. If the real object OJ-2 is formed of a material which is hardly deformed, the haptic sensor 40-2 may not be built in the real object OJ-2, but may be provided on the surface of the real object OJ-2.

Figure 14:
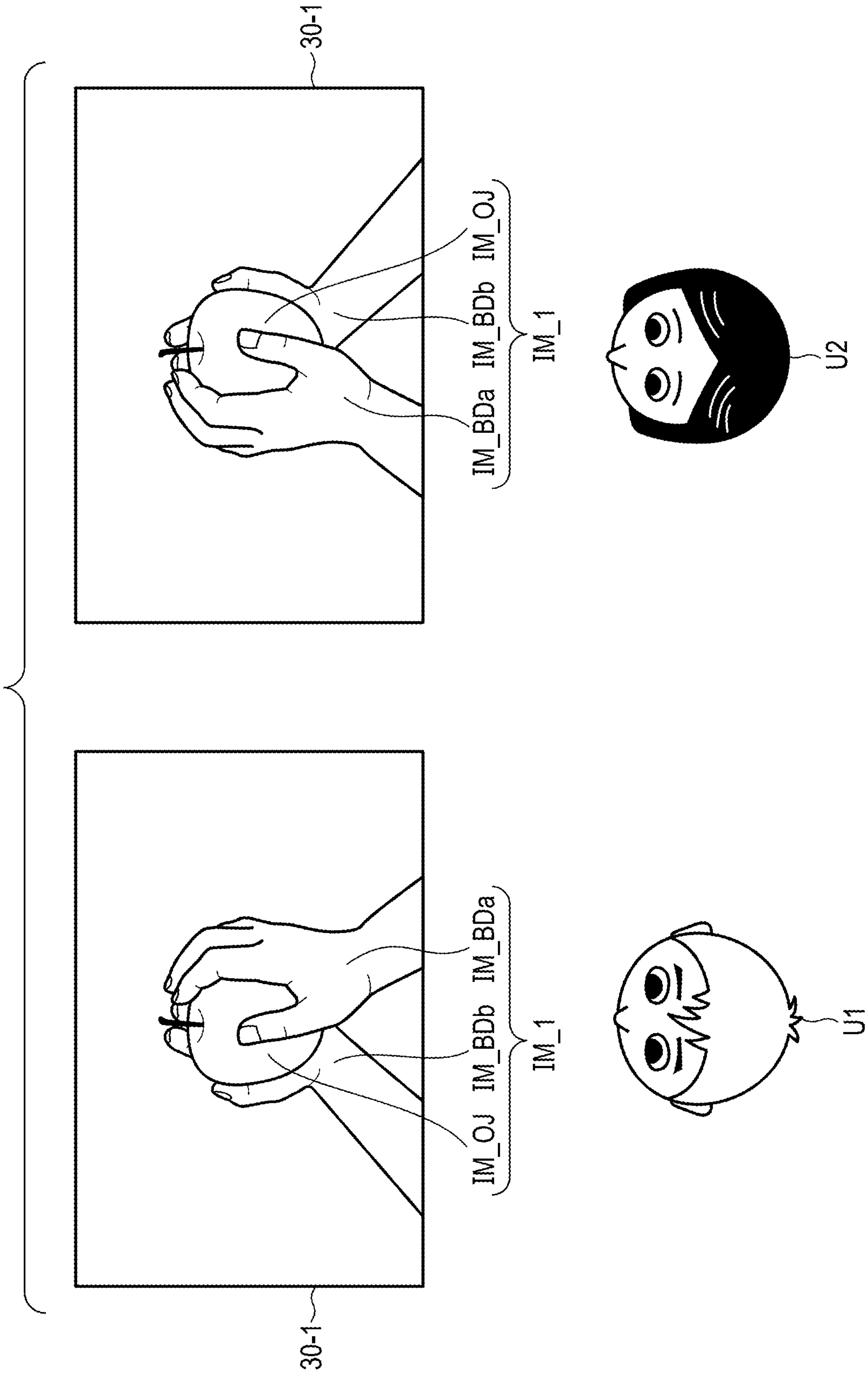
FIG. 14 is a diagram showing an example of an image IM_1 displayed on the display unit 30-1 shown in FIG. 13.

FIG. 14 is a diagram showing an example of an image IM_1 displayed on the display unit 30-1 shown in FIG. 13.

A left side of the figure is the image IM_1 on the display unit 30-1 observed by the user U1. A right side of the figure is the image IM_1 on the display unit 30-1 observed by the user U2, which is laterally inverted from the image IM_1 observed by the user U1.

The illustrated example corresponds to an example of an image IM_1 displayed on the display unit 30-1 when the specific part BD-1 of the user U1 grasps the real object OJ-1 via the haptic presentation unit 20-1 and the specific part BD-2 of the user U2 grasps the real object OJ-2 via the haptic presentation unit 20-2.

Such an image IM_1 is generated by the arithmetic processing unit 10. The image IM_1 includes, for example, simulated specific part images IM_BDa and IM_BDb, and a simulated object image IM_OJ. Both the specific part images IM_BDa and IM_BDb are images of hands. For example, these specific part images IM_BDa and IM_BDb may be generated by the arithmetic processing unit 10 as a moving image of specific part images in which at least one of the specific parts BD-1 and BD-2 are simulated. The object image IM_OJ, unlike the real objects OJ-1 and OJ-2, is an image of an apple in the illustrated example. The object image IM_OJ is located between the specific part images IM_BDa and IM_BDb.

As described above, the display unit 30-1 comprises a polymer dispersed liquid crystal panel. The display unit 30-1 sets the area where the object image IM_OJ and the specific part images IM_BDa and IM_BDb are displayed to a scattering state, and sets its surrounding to a transparent state.

When the user U1 observes the image IM_1, the user U1 can recognize the specific part image IM_BDa displayed in front of the object image IM_OJ as his/her own specific part (right hand), and recognize the specific part image IM_BDb displayed behind the object image IM_OJ as the user U2's specific part (left hand). At this time, the haptic presentation unit 20-1 is controlled by the arithmetic processing unit 10, and is driven to present the desired haptic sensation in accordance with the haptic information of the object image IM_OJ displayed on the display unit 30-1.

In addition, when the user U2 observes the image IM_1, the user U2 can recognize the specific part image IM_BDa displayed in front of the object image IM_OJ as his/her own specific part (left hand), and recognize the specific part image IM_BDb displayed behind the object image IM_OJ as the user U1's specific part (right hand). At this time, the haptic presentation unit 20-2 is controlled by the arithmetic processing unit 10, and is driven to present the desired haptic sensation in accordance with the haptic information of the object image IM_OJ displayed on the display unit 30-1.

Therefore, the fusion of the information displayed on the display unit 30-1 with the reality is promoted, and the users U1 and U2 can obtain the sensation as if the users grasped apples in their own hands and can share the sensation of grasping the same object.

In addition, since the user U1 inserting his/her right hand into the shield SD-1 observes the specific part image IM_BDa of the right hand which is displayed in front of the object image IM_OJ, and since the user U2 inserting his/her left hand into the shield SD-2 observes the specific part image IM_BDa of the left hand which is displayed in front of the object image IM_OJ, a higher sense of reality can be provided without making uncomfortable feeling on the user U1 and the user U2.

In addition, the arithmetic processing unit 10 can generate a moving image of the specific part image IM_BDa that follows the movement of the specific part BD-1 of the user U1, based on the spatial position information acquired by the information acquisition unit 11-1, and display the moving image on the display unit 30-1. Accordingly, the user U1 can be provided with a higher sense of reality.

Figure 15:
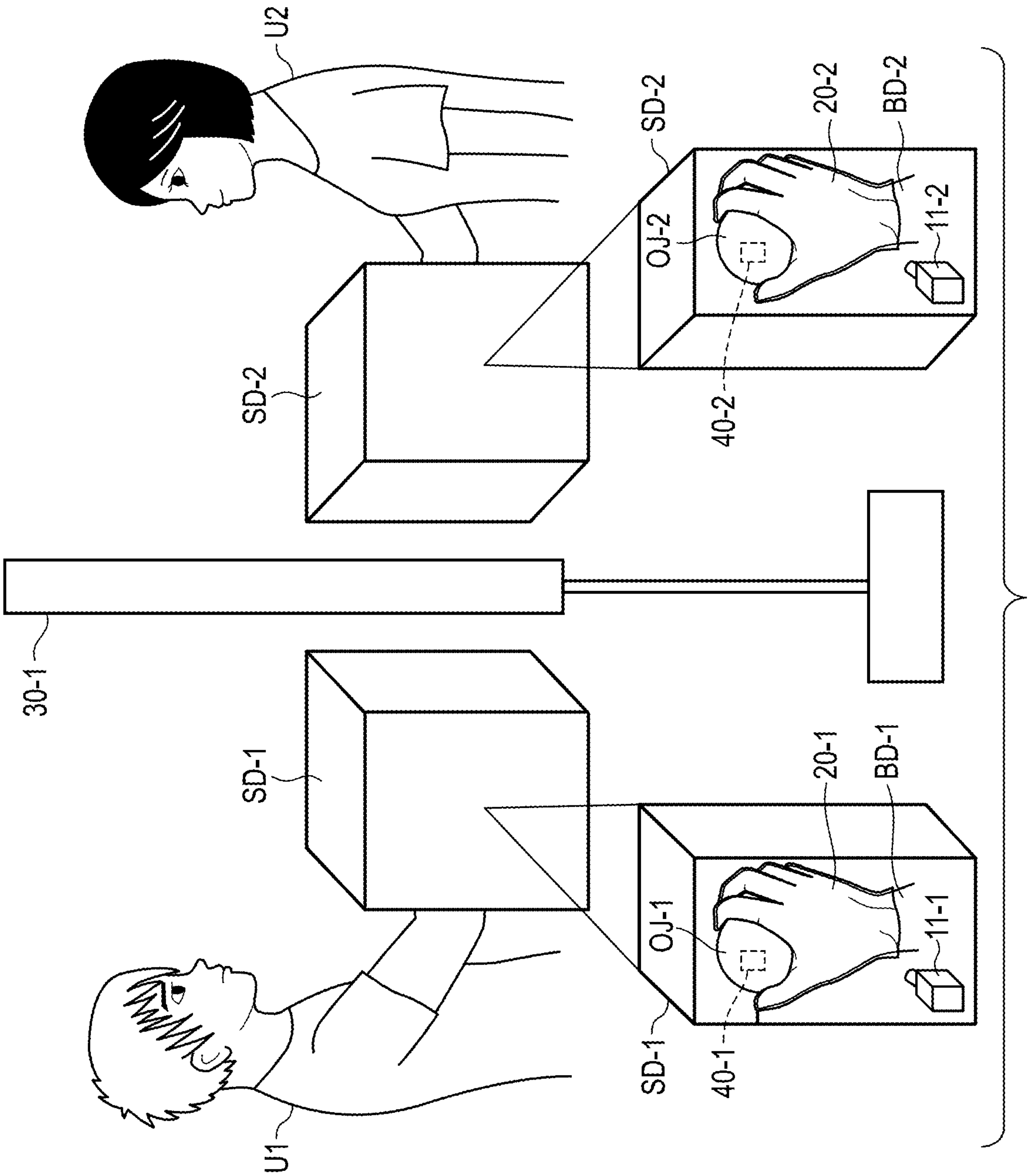
FIG. 15 is a diagram illustrating another example of use.

FIG. 15 is a diagram illustrating another example of use.

The illustrated example of use is different from the example of use shown in FIG. 13 in that the right hand of the user U1 corresponds to the specific part BD-1 and that the right hand of the user U2 corresponds to the specific part BD-2. In other words, in the example of use shown here, the specific part BD-1 of the user U1 and the specific part BD-2 of the user U2 are hands on the same side.

The user U1 and the user U2 face each other, and the display unit 30-1 is provided between the user U1 and the user U2. The haptic presentation unit 20-1 is attached to the specific part (right hand) BD-1 of the user U1, and the haptic presentation unit 20-2 is attached to the specific part (right hand) BD-2 of the user U2.

The user U1 inserts the specific part BD-1 to which the haptic presentation unit 20-1 is attached into the shield SD-1, and the user U2 inserts the specific part BD-2 to which the haptic presentation unit 20-2 is attached into the shield SD-2. The Information acquisition unit 11-1 captures the specific part BD-1 inside the shield SD-1 and outputs the spatial position information of the specific part BD-1 to the arithmetic processing unit 10. The Information acquisition unit 11-2 captures the specific part BD-2 inside the shield SD-2 and outputs the spatial position information of the specific part BD-2 to the arithmetic processing unit 10.

Figure 16:
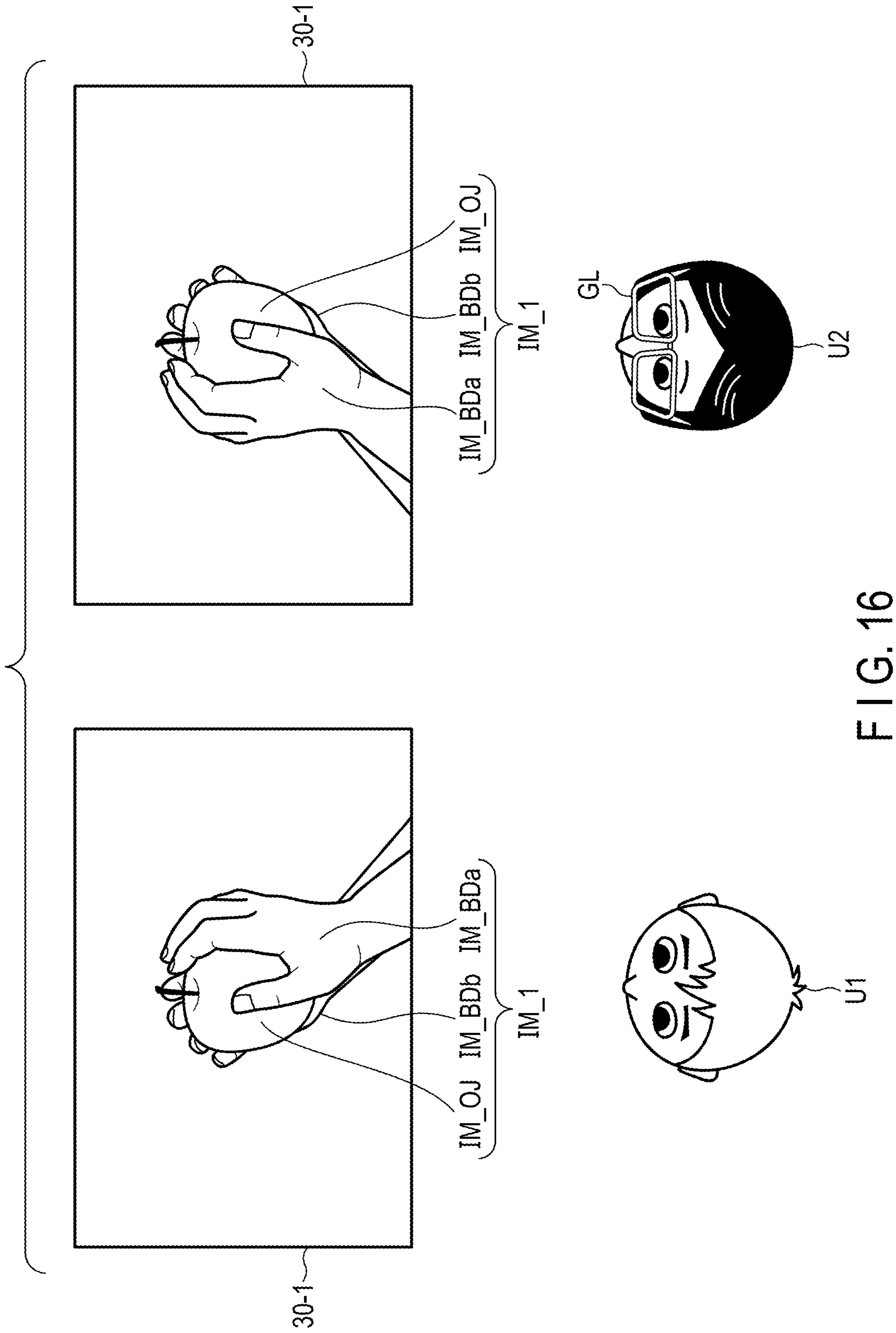
FIG. 16 is a diagram showing an example of the image IM_1 displayed on the display unit 30-1 shown in FIG. 15.

FIG. 16 is a diagram showing an example of the image IM_1 displayed on the display unit 30-1 shown in FIG. 15.

A left side of the figure is the image IM_1 on the display unit 30-1 observed by the user U1. A right side of the figure is the image IM_1 on the display unit 30-1 observed by the user U2, which is laterally inverted from the image IM_1 observed by the user U1.

The illustrated example corresponds to an example of an image IM_1 displayed on the display unit 30-1 when the specific part BD-1 of the user U1 grasps the real object OJ-1 via the haptic presentation unit 20-1 and the specific part BD-2 of the user U2 grasps the real object OJ-2 via the haptic presentation unit 20-2.

Such an image IM_1 is generated by the arithmetic processing unit 10. The image IM_1 includes, for example, images of hands which are the simulated specific part images IM_BDa and IM_BDb, and an image of an apple which is the simulated object image IM_OJ. The object image IM_OJ is located between the specific part images IM_BDa and IM_BDb.

When the user U1 observes the image IM_1, the user U1 can recognize the specific part image IM_BDa displayed in front of the object image IM_OJ as his/her own specific part (right hand), and recognize the specific part image IM_BDb displayed behind the object image IM_OJ as the user U2's specific part (right hand). At this time, the haptic presentation unit 20-1 is driven to present the the desired haptic sensation in accordance with the haptic information of the object image IM_OJ displayed on the display unit 30-1.

When the user U2 observes the image IM_1, the user U2 recognizes the specific part image IM_BDa displayed in front of the object image IM_OJ as his/her own specific part (left hand). At this time, the user U2 obtains uncomfortable feeling since the displayed specific part image IM_BDa is the left hand even though the user U2 inserts his/her right hand into the shield SD-2.

Therefore, the user U2 observes the image IM_1 while wearing left and right reversible glasses GL with which the user U2 can see laterally inverted image. Accordingly, the user U2 can recognize the specific part image IM_BDa of the left hand displayed in front of the object image IM_OJ as his/her own specific part (right hand), and recognize the specific part image IM_BDb of the left hand displayed behind the object image IM_OJ as the user U2's specific part (right hand). At this time, the haptic presentation unit 20-2 is driven to present the the desired haptic sensation in accordance with the haptic information of the object image IM_OJ displayed on the display unit 30-1.

Therefore, the fusion of the information displayed on the display unit 30-1 with the reality is promoted, and the users U1 and U2 can obtain the sensation without an uncomfortable feeling as if the users grasped apples in their own hands and can share the sensation of grasping the same object.

Figure 17:
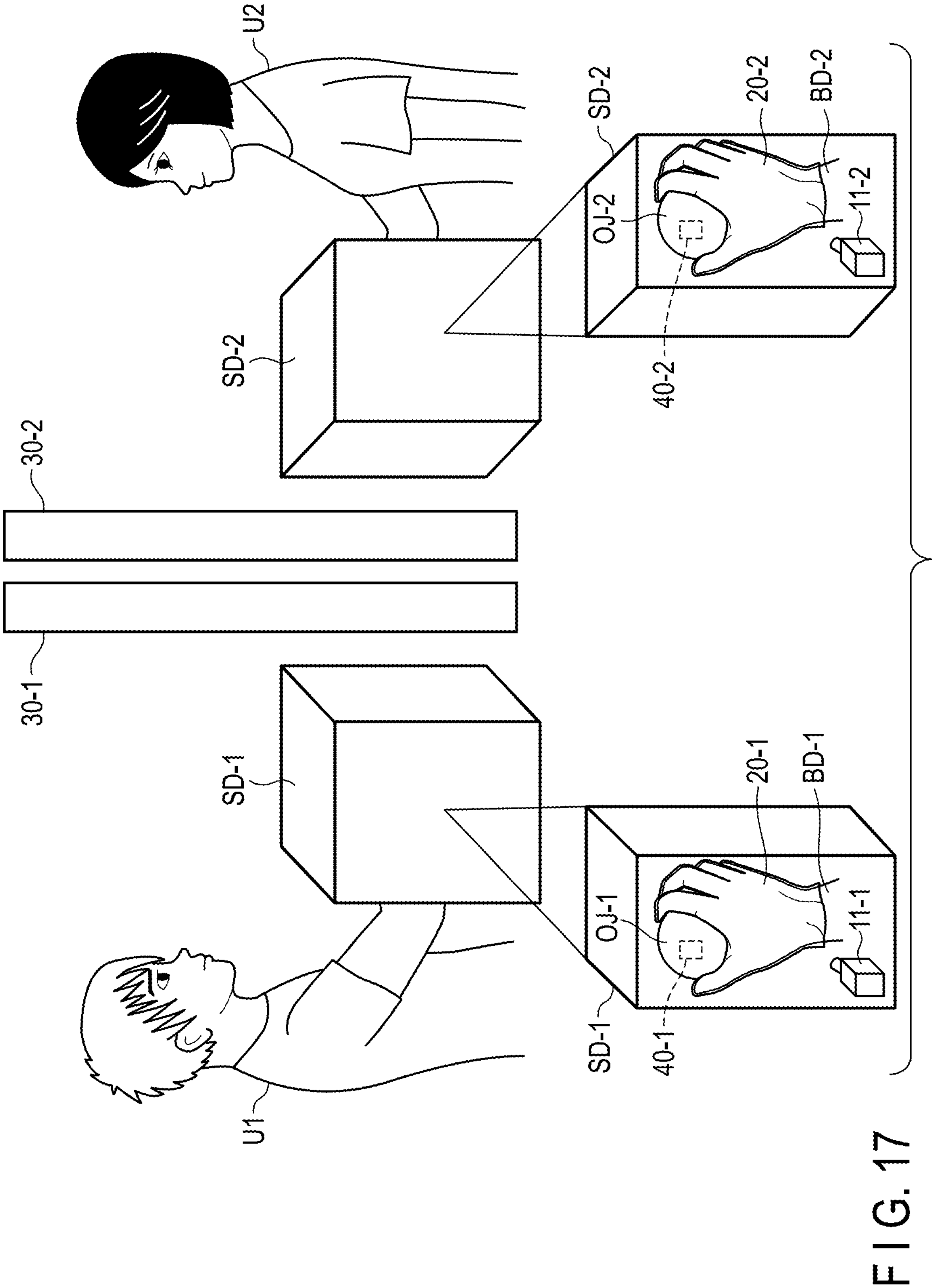
FIG. 17 is a diagram illustrating yet another example of use.

FIG. 17 is a diagram illustrating yet another example of use.

The illustrated example of use is different from the example of use shown in FIG. 13 in that a plurality of display units 30-1 and 30-2 are provided between the user U1 and the user U2. The display unit 30-1 is located between the user U1 and the display unit 30-2, and the display unit 30-2 is located between the user U2 and the display unit 30-1. The user U1 and the user U2 face each other so as to observe the overlapping display units 30-1 and 30-2.

In the example of use shown here, the haptic presentation unit 20-1 is attached to the specific part (right hand) BD-1 of the user U1, and the haptic presentation unit 20-2 is attached to the specific part (right hand) BD-2 of the user U2.

The user U1 inserts the specific part BD-1 to which the haptic presentation unit 20-1 is attached into the shield SD-1, and the user U2 inserts the specific part BD-2 to which the haptic presentation unit 20-2 is attached into the shield SD-2. The Information acquisition unit 11-1 captures the specific part BD-1 inside the shield SD-1 and outputs the spatial position information of the specific part BD-1 to the arithmetic processing unit 10. The Information acquisition unit 11-2 captures the specific part BD-2 inside the shield SD-2 and outputs the spatial position information of the specific part BD-2 to the arithmetic processing unit 10.

Figure 18:
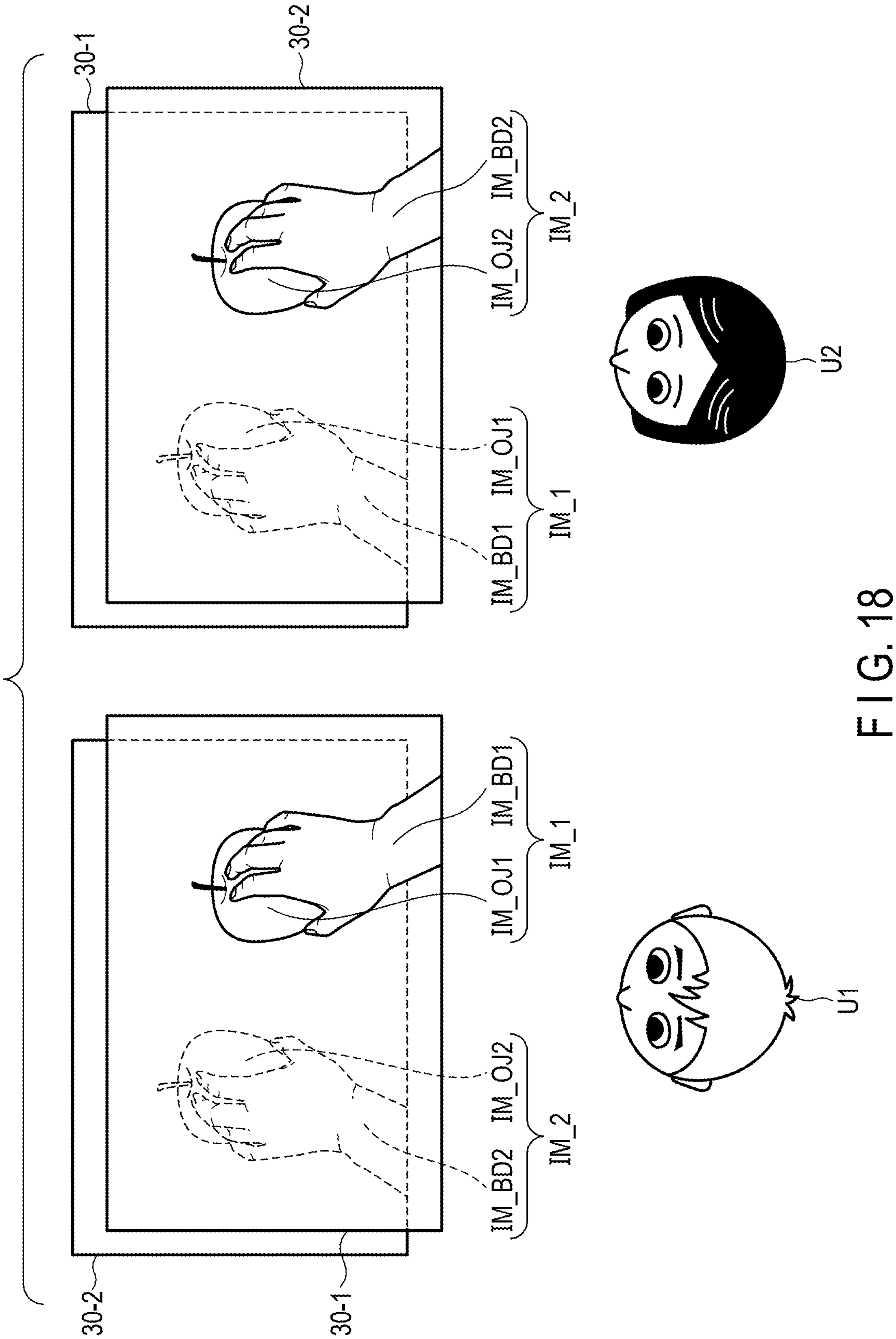
FIG. 18 is a diagram showing an example of each of the image IM_1 displayed on the display unit 30-1 and an image IM_2 displayed on a display unit 30-2 shown in FIG. 17.

FIG. 18 is a diagram showing an example of each of the image IM_1 displayed on the display unit 30-1 and an image IM_2 displayed on a display unit 30-2 shown in FIG. 17.

A left side of the figure is the image IM_1 on the display unit 30-1 and the image IM_2 on the display unit 30-2, which are observed by the user U1. The user U1 can observe the display unit 30-2 via the display unit 30-1.

A right side of the figure is the image IM_1 on the display unit 30-1 and the image IM_2 on the display unit 30-2, which are observed by the user U2. The user U2 can observe the display unit 30-1 via the display unit 30-2. The images IM_1 and IM_2 observed by the user U2 are the images obtained by laterally inverting the images IM_1 and IM_2 observed by the user U1.

In the illustrated example, the display unit 30-1 are provided in correspondence with the user U1, and the display unit 30-2 may be provided in correspondence with the user U2. The illustrated example of the image IM_1 is displayed on the display unit 30-1 when the specific part BD-1 of the user U1 grasps the real object OJ-1 via the haptic presentation unit 20-1. The illustrated example of the image IM_2 is displayed on the display unit 30-2 when the specific part BD-2 of the user U2 grasps the real object OJ-2 via the haptic presentation unit 20-2. These images IM_1 and IM_2 are generated by the arithmetic processing unit 10.

The image IM_1 includes, for example, an image of the hand which is the simulated specific part image IM_BD1, and an image of an apple which is the simulated object image IM_OJ1. The specific part image IM_BD1 is a right hand image obtained by simulating the right hand which the user U1 inserts into the shield SD-1, and is observed as a right hand by the user U1. The arithmetic processing unit 10 generates the specific part image IM_BD1 that follows the movement of the specific part BD-1 based on the spatial position information acquired by the information acquisition unit 11-1, and displays the image on the display unit 30-1. Therefore, when the user U1 moves the specific part BD-1 while grasping the real object OJ-1, the image IM_1 is displayed on the display unit 30-1 as a moving image in which the specific part image IM_BD1 and the object image IM_OJ1 are displaced to follow the movement of the specific part BD-1.

The image IM_2 includes, for example, an image of the hand which is the simulated specific part image IM_BD2, and an image of an apple which is the simulated object image IM_OJ2. The specific part image IM_BD2 is a right hand image obtained by simulating the right hand which the user U2 inserts into the shield SD-2, and is observed as a right hand by the user U2. The arithmetic processing unit 10 generates the specific part image IM_BD2 that follows the movement of the specific part BD-2 based on the spatial position information acquired by the information acquisition unit 11-2, and displays the image on the display unit 30-2. Therefore, when the user U2 moves the specific part BD-2 while grasping the real object OJ-2, the image IM_2 is displayed on the display unit 30-2 as a moving image in which the specific part image IM_BD2 and the object image IM_OJ2 are displaced to follow the movement of the specific part BD-2.

When the user U1 observes the image IM_1, the user U1 can recognize the specific part image IM_BD1 displayed in front of the object image IM_OJ1 as his/her own specific part (right hand). At this time, the haptic presentation unit 20-1 is controlled by the arithmetic processing unit 10, and is driven to present the desired haptic sensation in accordance with the haptic information of the object image IM_OJ1 displayed on the display unit 30-1. In addition, at the same time, the user U1 can observe the image IM_2 via the display unit 30-1.

When the user U2 observes the image IM_2, the user U2 can recognize the specific part image IM_BD2 displayed in front of the object image IM_OJ2 as his/her own specific part (right hand). At this time, the haptic presentation unit 20-2 is controlled by the arithmetic processing unit 10, and is driven to present the desired haptic sensation in accordance with the haptic information of the object image IM_OJ2 displayed on the display unit 30-2. In addition, at the same time, the user U2 can observe the image IM_1 via the display unit 30-2.

Therefore, the fusion of the information displayed on the display unit 30-1 with the reality is promoted, and the user U1 can obtain the sensation without an uncomfortable feeling as if the user grasped an apple in his/her own hand. In addition, the fusion of the information displayed on the display unit 30-2 with the reality is promoted, and the user U2 can obtain the sensation without an uncomfortable feeling as if the user grasped an apple in his/her own hand. Furthermore, if the object image IM_OJ1 is the same as the object image IM_OJ2, the sensation of grasping the same object can be shared.

Incidentally, it has been described that the display unit 30-1 is provided to correspond to the user U1 and that the display unit 30-2 is provided to correspond to the user U2. However, the display units are not limited to this case.

For example, the image IM_1 shown in FIG. 14, FIG. 16, and the like may be displayed on the display unit 30-1, and the image IM_2 corresponding to the other content may be displayed at a position which does not overlap with the image IM_1, on the display unit 30-2. In this case, the user U1 and the user U2 can observe the image IM_1 and the image IM_2 overlapping with each other, and can be provide the user U1 and the user U2 with more information.

In addition, the image IM_1 shown in FIG. 14, FIG. 16, and the like may be displayed on the display unit 30-1, and the image IM_2 which is the same as the image IM_1 may be displayed at a position which overlaps with the image IM_1, on the display unit 30-2. In this case, the user U1 and the user U2 can obtain a sense of depth by observing the image IM_1 and the image IM_2 overlapping with each other. Incidentally, for the users who have an uncomfortable feeling due to lateral inversion of the observed image, the uncomfortable feeling can be eliminated by having the users wear the left and right reversible glasses GL, as described with reference to FIG. 16.

Figure 19:
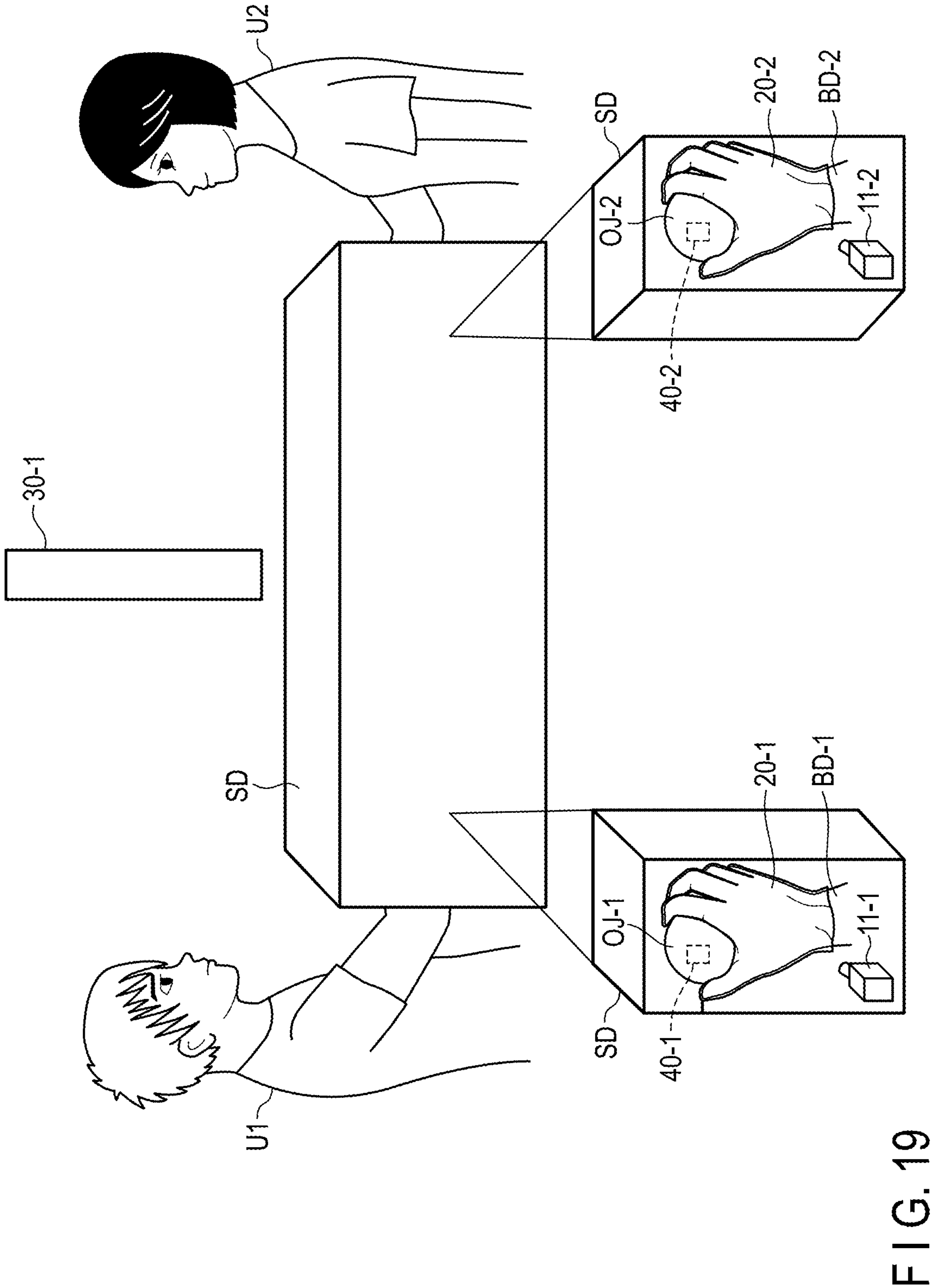
FIG. 19 is a diagram illustrating yet another example of use.

FIG. 19 is a diagram illustrating yet another example of use.

The illustrated example of use is different from the example of use shown in FIG. 13 in that a common shield SD obtained by integrating the shield SD-1 and the shield SD-2 is provided between user the U1 and the user U2. The information acquisition units 11-1 and 11-2 are provided inside the box-shaped shield SD. Furthermore, in the illustrated example, the real object OJ-1 incorporating the haptic sensor 40-1 and the real object OJ-2 incorporating the haptic sensor 40-2 are provided inside the shield SD. The inside of the shield SD does not need to be partitioned, and the specific part BD-1 of the user U1 and the specific part BD-2 of the user U2 can be brought into contact with each other inside the shield SD.

In the example of use shown here, the haptic presentation unit 20-1 is attached to the specific part (right hand) BD-1 of the user U1, and the haptic presentation unit 20-2 is attached to the specific part (right hand) BD-2 of the user U2.

The user U1 inserts the specific part BD-1 to which the haptic presentation unit 20-1 is attached into the shield SD, and the user U2 inserts the specific part BD-2 to which the haptic presentation unit 20-2 is attached into the shield SD. The Information acquisition unit 11-1 captures the specific part BD-1 inside the shield SD and outputs the spatial position information of the specific part BD-1 to the arithmetic processing unit 10. The Information acquisition unit 11-2 captures the specific part BD-2 inside the shield SD and outputs the spatial position information of the specific part BD-2 to the arithmetic processing unit 10.

At this time, the image IM_1 shown in FIG. 14, FIG. 16, and the like is displayed on the display unit 30-1.

Alternatively, a display unit 30-2 overlapping with the display unit 30-1 may be provided between the user U1 and the user U2, similarly to the example of use described with reference to FIG. 17. The image IM_1 displayed on the display unit 30-1 and the image IM_2 displayed on the display unit 30-2 in this case have been described above.

Incidentally, the real objects OJ-1 and OJ-2 may be omitted. In this case, for example, the user U1 and the user U2 can share haptic sensations by coming into contact with each other inside the shield SD. In other words, a specific part (finger) of the user U1 comes into contact with a specific part (finger) of the user U2 and they press against each other. At this time, an image of a finger pressing an apple is displayed on the display unit 30-1. Then, the haptic sensation presentation unit 20-1 is driven to present a desired haptic sensation to the finger of the user U1. In addition, the haptic sensation presentation unit 20-2 is driven to present a desired haptic sensation to the finger of the user U2. Accordingly, each of the users U1 and U3 can obtain the sensation of pressing an apple and share the sensation.

Figure 20:
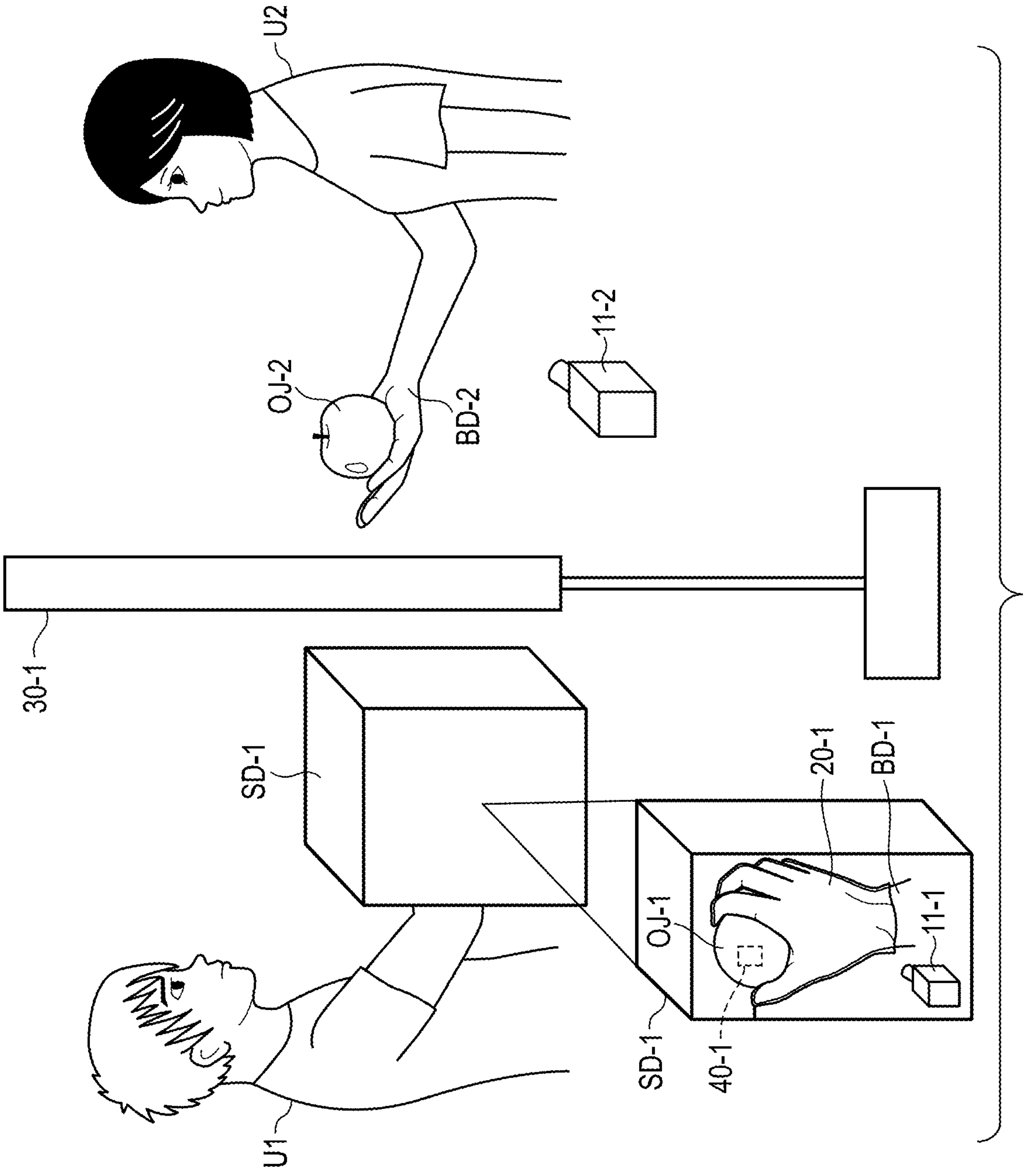
FIG. 20 is a diagram illustrating yet another example of use.

FIG. 20 is a diagram illustrating yet another example of use.

The illustrated example of use is different from the example of use shown in FIG. 13 in that the shield SD-2 is not provided and that the information acquisition unit 11-2 captures the real object OJ-2. In the illustrated example, the real object OJ-2 is placed on the right hand of the user U2, which is the specific part BD-2, on the side opposite to the user U1 across the display unit 30-1. The information acquisition unit 11-2 captures the real object OJ-2 including the specific part BD-2, extracts the only real object OJ-2, and outputs information corresponding to the real object OJ-2 to the arithmetic processing unit 10. The arithmetic processing unit 10 can generate a three-dimensional image corresponding to the real object OJ-2, based on the information of the real object OJ-2 acquired by the information acquisition unit 11-2.

The user U1 and the user U2 face each other, and the display unit 30-1 is located between the user U1 and the user U2.

The user U1 inserts the specific part BD-1 to which the haptic presentation unit 20-1 is attached into the shield SD-1. The Information acquisition unit 11-1 captures the specific part BD-1 inside the shield SD-1 and outputs the spatial position information of the specific part BD-1 to the arithmetic processing unit 10.

Figure 21:
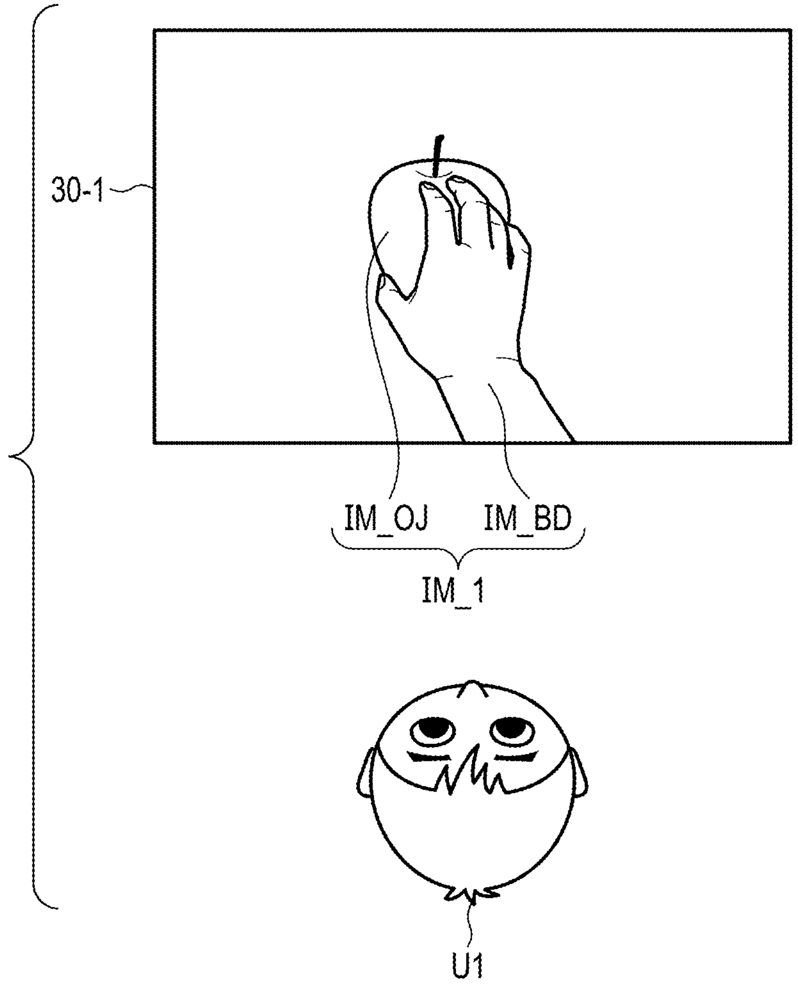
FIG. 21 is a diagram showing an example of the image IM_1 displayed on the display unit 30-1 shown in FIG. 20.

FIG. 21 is a diagram showing an example of the image IM_1 displayed on the display unit 30-1 shown in FIG. 20.

The illustrated example corresponds to the example of the image IM_1 displayed on the display unit 30-1 when the specific part BD-1 of the user U1 grasps the real object OJ-1 via the haptic presentation unit 20-1. The image IM_1 is generated by the arithmetic processing unit 10 and includes, for example, an image of the hand which is the simulated specific part image IM_BD1, and an image of an apple which is the simulated object image IM_OJ1.

The specific part image IM_BD is a right hand image obtained by simulating the right hand which the user U1 inserts into the shield SD-1, and is observed as a right hand by the user U1. When the specific part BD-1 moves, the specific part image IM_BD1 is displaced to follow the movement of the specific part BD-1.

The object image IM_OJ is the three-dimensional image of the real object OJ-2 on the hand of the user U2, and is generated by the arithmetic processing unit 10, based on the information acquired by the information acquisition unit 11-2 as described above. When the real object OJ-2 is moved by the user U2, the object image IM_OJ is displaced to follow the movement of the real object OJ-2.

When the user U1 observes the image IM_1, the user U1 can recognize the specific part image IM_BD displayed in front of the object image IM_OJ as his/her own specific part (right hand). At this time, the haptic presentation unit 20-1 is controlled by the arithmetic processing unit 10, and is driven to present the desired haptic sensation in accordance with the haptic information of the object image IM_OJ displayed on the display unit 30-1.

Therefore, the fusion of the information displayed on the display unit 30-1 with the reality is promoted, and the user U1 can obtain the sensation without an uncomfortable feeling as if the user touched an apple in his/her own hand.

As another example of use, when the user U2 grasps the real object OJ-2 with the hand wearing the haptic sensor, the haptic sensor outputs the haptic information to the arithmetic processing unit 10, and the haptic presentation unit 20-1 worn by user U1 is driven in response to this haptic information, and the haptic information can be thereby transmitted from the user U2 to the user U1.

Figure 22:
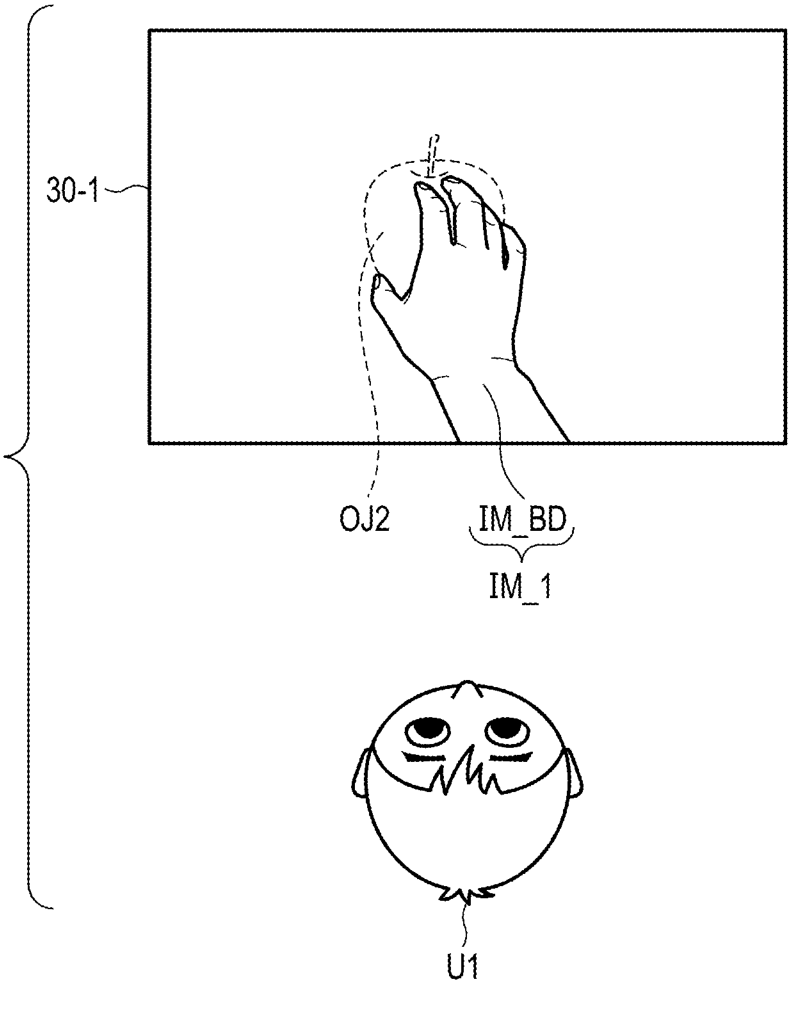
FIG. 22 is a diagram showing another example of the image IM_1 displayed on the display unit 30-1 shown in FIG. 20.

FIG. 22 is a diagram showing another example of the image IM_1 displayed on the display unit 30-1 shown in FIG. 20.

The illustrated example corresponds to the example of the image IM_1 displayed on the display unit 30-1 when the specific part BD-1 of the user U1 grasps the real object OJ-1 via the haptic presentation unit 20-1. The image IM_1 is generated by the arithmetic processing unit 10, and includes, for example, an image of the hand, which is the simulated specific part image IM_BD.

The specific part image IM_BD is a right hand image obtained by simulating the right hand which the user U1 inserts into the shield SD-1, and is observed as a right hand by the user U1. When the specific part BD-1 moves, the image IM_1 is displayed on the display unit 30-1 as a moving image in which the specific part image IM_BD1 is displaced to follow the movement of the specific part BD-1.

When the user U1 observes the image IM_1, the user U1 can recognize the specific part image IM_BD displayed on the display unit 30-1 as his/her own specific part (right hand). In addition, the user U1 can observe the real object OJ-2 on the hand of the user U2 overlapping with the background of the display unit 30-1, along with the specific part image IM_BD. At this time, the haptic presentation unit 20-1 is driven to present the desired haptic sensation in accordance with the haptic information of the real object OJ-2.

Therefore, the fusion of the information displayed on the display unit 30-1 with the reality is promoted, and the user U1 can obtain the sensation without an uncomfortable feeling as if the user touched an apple in his/her own hand.

Embodiment 4

Figure 23:
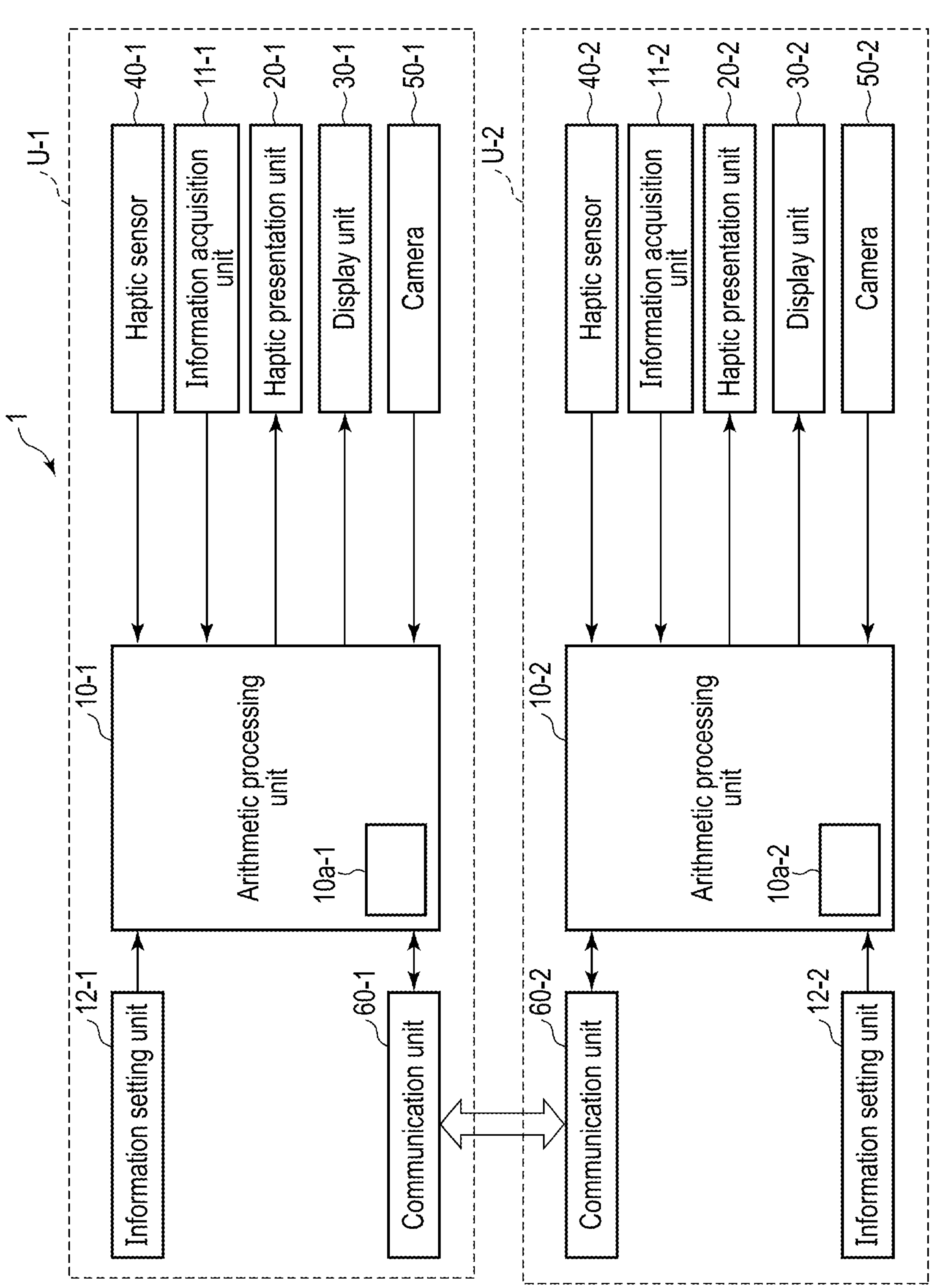
FIG. 23 is a diagram showing yet another configuration example of the augmented reality presentation system 1.

FIG. 23 is a diagram showing yet another configuration example of the augmented reality presentation system 1.

The augmented reality presentation system 1 comprises, as a system corresponding to a user U1, an arithmetic processing unit 10-1 including an image generation unit 10*a*-1, an information acquisition unit 11-1, an information setting unit 12-1, a haptic presentation unit 20-1, a display unit 30-1, a haptic sensor 40-1, a camera 50-1, and a communication unit 60-1. The camera 50-1 captures the user U1 via the display unit 30-1. The communication unit 60-1 transmits and receives information under the control of the arithmetic processing unit 10-1.

In addition, the augmented reality presentation system 1 comprises, as a system corresponding to the user U2, an arithmetic processing unit 10-2 including an image generation unit 10*a*-2, an information acquisition unit 11-2, an information setting unit 12-2, a haptic presentation unit 20-2, a display unit 30-2, a haptic sensor 40-2, a camera 50-2, and a communication unit 60-2. The camera 50-2 captures an image of the user U2 via the display unit 30-2. The communication unit 60-2 transmits and receives information under the control of the arithmetic processing unit 10-2.

Incidentally, in the above system, the haptic sensors 40-1 and 40-2 may be omitted.

Details of each unit have been described above.

The communication units 60-1 and 60-2 are connected to each other via a communication line. Accordingly, for example, various information acquired by the information acquisition unit 11-1, the haptic sensor 40-1, the camera 50-1, and the like can be transmitted to the communication unit 60-2 via the communication unit 60-1. In addition, various information acquired by the information acquisition unit 11-2, the haptic sensor 40-2, the camera 50-2, and the like can be transmitted to the communication unit 60-1 via the communication unit 60-2.

Therefore, the arithmetic processing unit 10-1 can generate an image IM_1 to be displayed on the display unit 30-1, based on not only various information acquired by the information acquisition unit 11-1, the haptic sensor 40-1, the camera 50-1, and the like, but also various information acquired by the information acquisition unit 11-2, the haptic sensor 40-2, the camera 50-2, and the like.

Similarly, the arithmetic processing unit 10-2 can generate an image IM_2 to be displayed on the display unit 30-2, based on not only various information acquired by the information acquisition unit 11-2, the haptic sensor 40-2, the camera 50-2, and the like, but also various information acquired by the information acquisition unit 11-1, the haptic sensor 40-1, the camera 50-1, and the like.

In such a configuration example, for example, the user U1 corresponds to a first user, the specific part of the user U1 corresponds to a first specific part, the user U2 corresponds to a second user, and the specific part of user U2 corresponds to a second specific part. The information acquisition unit 11-1 corresponds to a first information acquisition unit, and the information acquisition unit 11-2 corresponds to a second information acquisition unit. The haptic presentation unit 20-1 corresponds to a first haptic presentation unit, and the haptic presentation unit 20-2 corresponds to a second haptic presentation unit. The display unit 30-1 corresponds to a first display unit, and the display unit 30-2 corresponds to a second display unit. The camera 50-1 corresponds to a first camera, and the camera 50-2 corresponds to a second camera. The communication unit 60-1 corresponds to a first communication unit, and the communication unit 60-2 corresponds to a second communication unit.

Incidentally, the augmented reality presentation system 1 shown here is configured as a system corresponding to two users, but may also be configured as a system corresponding to three or more users who can communicate with each other.

Figure 24:
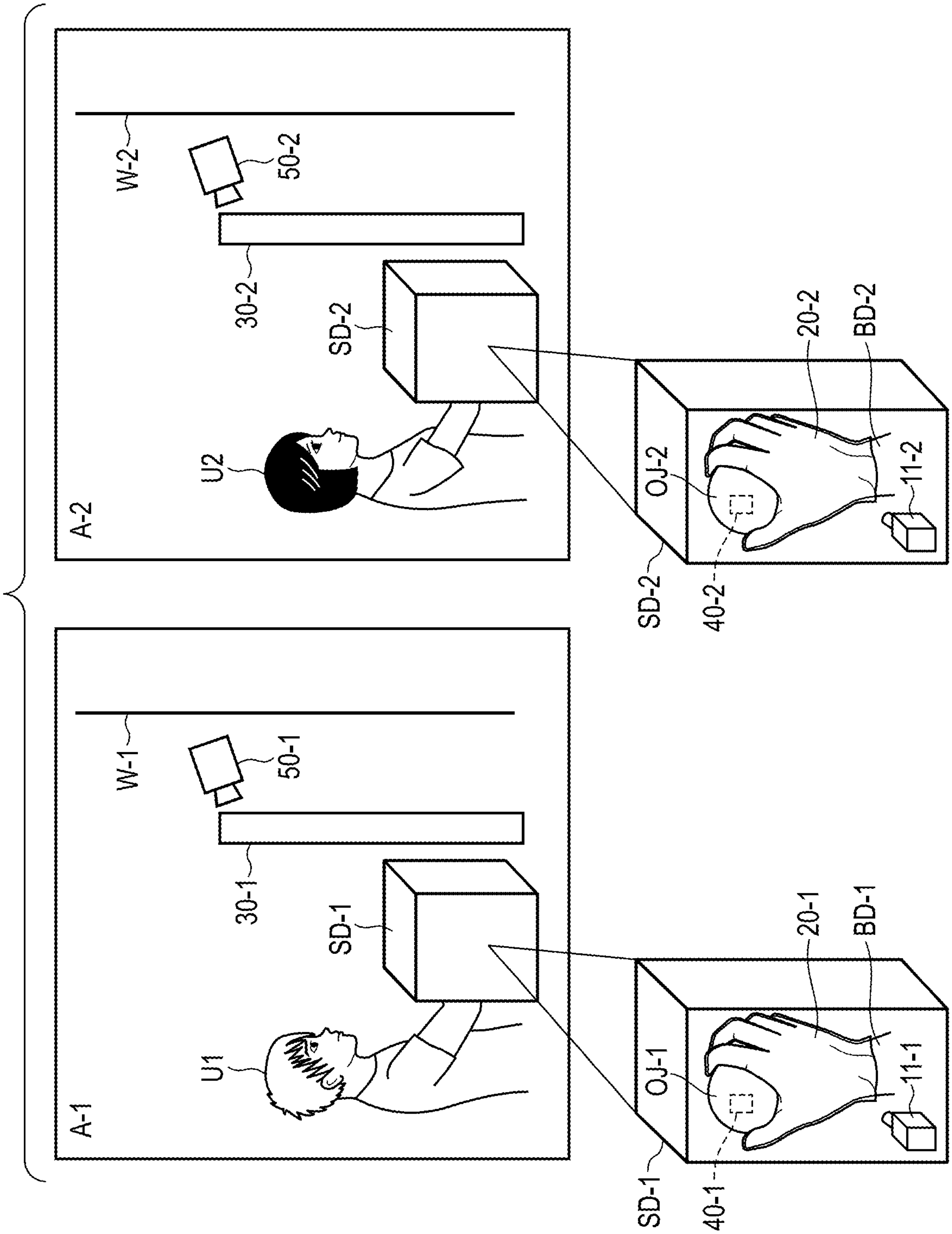
FIG. 24 is a diagram illustrating an example of use.

FIG. 24 is a diagram illustrating an example of use.

The illustrated example corresponds to a case where the user U1 and the user U2 use the system while located in different spaces.

First, the system corresponding to the user U1 will be described. In space A-1 where the user U1 is located, the display unit 30-1, the camera 50-1, and a shield (first shield) SD-1 are provided. The camera 50-1 is provided behind the display unit 30-1. As described above, the display unit 30-1 comprises a polymer dispersed liquid crystal panel. Therefore, the user U1 can visually recognize a wall W-1 behind the display unit 30-1 while observing the display unit 30-1. In addition, the camera 50-1 can capture the user U1 through the display unit 30-1. At this time, the camera 50-1 can capture the user U1 observing the display unit 30-1 from almost the front. In other words, it is possible to capture the user U1 facing forward with a more natural line of sight.

In this example, a right hand of the user U1 corresponds to a specific part BD-1. The haptic presentation unit 20-1 is formed in a glove-like shape and is attached to the specific part BD-1. The real object OJ-1 is located inside the box-shaped shield (first shield) SD-1.

The user U1 inserts the specific part BD-1 to which the haptic presentation unit 20-1 is attached into the shield SD-1 and grasps the real object OJ-1. The user U1 cannot visually recognize his/her own specific part BD-1, the haptic presentation unit 20-1, or the real object OJ-1.

The information acquisition unit 11-1 is provided inside the shield SD-1, captures an image of the specific part BD-1 grasping the real object OJ-1 via the haptic presentation unit 20-1, acquires spatial position information of the specific part BD-1, and outputs the information to the arithmetic processing unit 10-1.

Next, the system corresponding to the user U2 will be described. In space A-2 where the user U2 is located, the display unit 30-2, the camera 50-2, and a shield (second shield) SD-2 are provided. The camera 50-2 is provided behind the display unit 30-2. As described above, the display unit 30-2 comprises a polymer dispersed liquid crystal panel. Therefore, the user U2 can visually recognize a wall W-2 behind the display unit 30-2 while observing the display unit 30-2. In addition, the camera 50-2 can capture the user U2 through the display unit 30-2. At this time, the camera 50-2 can capture the user U2 observing the display unit 30-2 from almost the front. In other words, it is possible to capture the user U2 facing forward with a more natural line of sight.

In this example, a right hand of the user U2 corresponds to a specific part BD-2. The haptic presentation unit 20-2 is formed in a glove-like shape and is attached to the specific part BD-2. The real object OJ-2 is located inside the box-shaped shield (second shield) SD-2.

The user U2 inserts the specific part BD-2 to which the haptic presentation unit 20-2 is attached into the shield SD-2 and grasps the real object OJ-2. The user U2 cannot visually recognize his/her own specific part BD-2, the haptic presentation unit 20-2, or the real object OJ-2.

The information acquisition unit 11-2 is provided inside the shield SD-2, captures an image of the specific part BD-2 grasping the real object OJ-2 via the haptic presentation unit 20-2, acquires spatial position information of the specific part BD-2, and outputs the information to the arithmetic processing unit 10-2.

Figure 25:
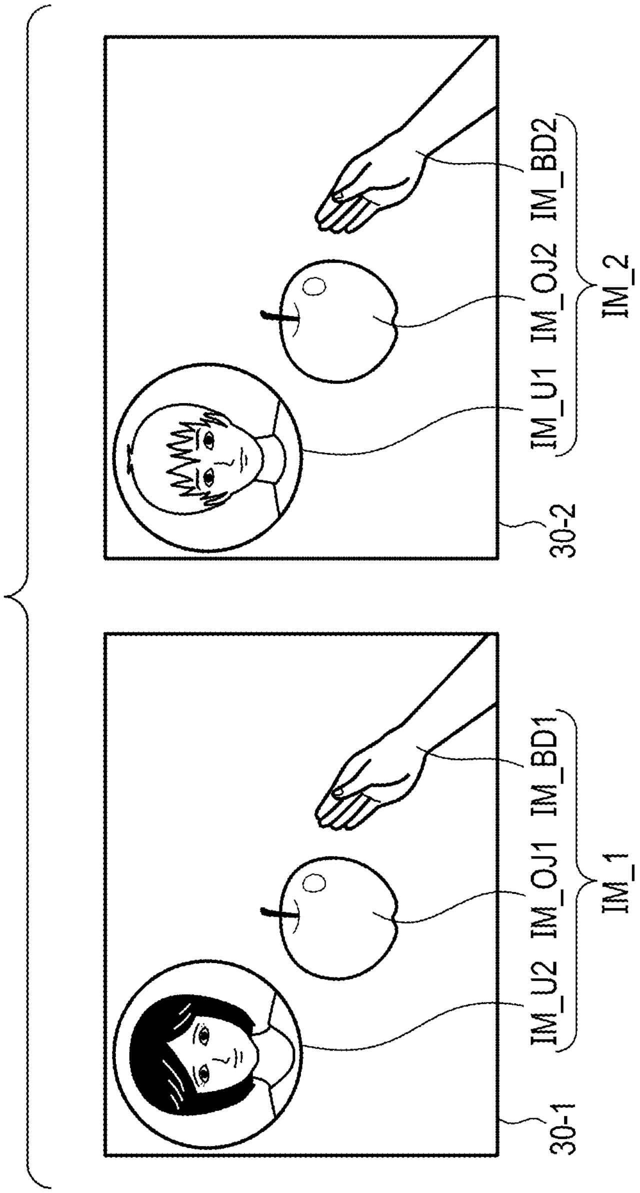
FIG. 25 is a diagram showing an example of each of the image IM_1 displayed on the display unit 30-1 and the image IM_2 displayed on the display unit 30-2 shown in FIG. 24.

FIG. 25 is a diagram showing an example of each of the image IM_1 displayed on the display unit 30-1 and the image IM_2 displayed on the display unit 30-2 shown in FIG. 24.

A left side of the figure is the image IM_1 on the display unit 30-1 observed by the user U1. The user U1 can observe the background of the display unit 30-1 in the same manner as that described with reference to FIG. 11.

A right side of the figure is the image IM_2 on the display unit 30-2 observed by the user U2. The user U2 can observe the background of the display unit 30-2 in the same manner as that described with reference to FIG. 11.

The example of the image IM_1 is displayed on the display unit 30-1 when the specific part BD-1 of the user U grasps the real object OJ-1 via the haptic presentation unit 20-1. The image IM_1 is generated by the arithmetic processing unit 10-1.

The example of the image IM_2 is displayed on the display unit 30-2 when the specific part BD-2 of the user U2 grasps the real object OJ-2 via the haptic presentation unit 20-2. The image IM_2 is generated by the arithmetic processing unit 10-2.

The image IM_1 includes, for example, an image (for example, face image) IM_U2 of the user U2, a hand image which is the simulated specific part image IM_BD1, and an apple image which is the simulated object image IM_OJ1. The specific part image IM_BD1 is a right hand image obtained by simulating the right hand which the user U1 inserts into the shield SD-1, and is observed as a right hand by the user U1.

The arithmetic processing unit 10-1 generates the specific part image IM_BD1 that follows the movement of the specific part BD-1 based on the spatial position information acquired by the information acquisition unit 11-1, and displays the image on the display unit 30-1. Therefore, when the user U1 moves the specific part BD-1 while grasping the real object OJ-1, the image IM_1 is displayed on the display unit 30-1 as a moving image in which the specific part image IM_BD1 and the object image IM_OJ1 are displaced to follow the movement of the specific part BD-1.

In addition, the arithmetic processing unit 10-1 displays the image IM_U2 of the user U2 captured by the camera 50-2 on the display unit 30-1, based on the information received from the system corresponding to the user U2 via the communication units 60-1 and 60-2.

The image IM_2 includes, for example, an image (for example, face image) IM_U1 of the user U1, a hand image which is the simulated specific part image IM_BD2, and an apple image which is the simulated object image IM_OJ2. The specific part image IM_BD2 is a right hand image obtained by simulating the right hand which the user U2 inserts into the shield SD-2, and is observed as a right hand by the user U2. Incidentally, the object image IM_OJ2 is, for example, the apple image which is the same as the object image IM_OJ1, but is not limited to this. Alternatively, the object image IM_OJ2 may be different from the object image IM_OJ2.

The arithmetic processing unit 10-2 generates the specific part image IM_BD2 that follows the movement of the specific part BD-2, based on the spatial position information acquired by the information acquisition unit 11-2, and displays the image on the display unit 30-2. Therefore, when the user U2 moves the specific part BD-2 while grasping the real object OJ-2, the image IM_2 is displayed on the display unit 30-2 as a moving image in which the specific part image IM_BD2 and the object image IM_OJ2 are displaced to follow the movement of the specific part BD-2.

In addition, the arithmetic processing unit 10-2 displays the image IM_U1 of the user U1 captured by the camera 50-1 on the display unit 30-2, based on the information received from the system corresponding to the user U1 via the communication units 60-1 and 60-2.

When the user U1 observes the image IM_1, the user U1 can recognize the specific part image IM_BD1 as his/her own specific part (right hand). At this time, the haptic presentation unit 20-1 is controlled by the arithmetic processing unit 10-1, and is driven to present the desired haptic sensation in accordance with the haptic information of the object image IM_OJ1 displayed on the display unit 30-1. At this time, the haptic information includes, for example, information which is set by the information setting unit 12-1.

When the user U2 observes the image IM_2, the user U2 can recognize the specific part image IM_BD2 as his/her own specific part (right hand). At this time, the haptic presentation unit 20-2 is controlled by the arithmetic processing unit 10-2, and is driven to present the desired haptic sensation in accordance with the haptic information of the object image IM_OJ2 displayed on the display unit 30-2. At this time, the haptic information includes, for example, information which is set by the information setting unit 12-2.

Therefore, the fusion of the information displayed on the display unit 30-1 with the reality is promoted, and the user U1 can obtain the sensation without an uncomfortable feeling as if the user grasped the same apple as the user U2 grasps in his/her own hand. In addition, the user U1 can make eye contact with the user U2, who faces forward, by observing the image IM_U2, and can thereby obtain the sensation of sharing the same haptic sensation.

In addition, the fusion of the information displayed on the display unit 30-2 with the reality is promoted, and the user U2 can obtain the sensation without an uncomfortable feeling as if the user grasped the same apple as the user U1 grasps in his/her own hand. In addition, the user U2 can make eye contact with the user U1, who faces forward, by observing the image IM_U1, and can thereby obtain the sensation of sharing the same haptic sensation.

Figure 26:
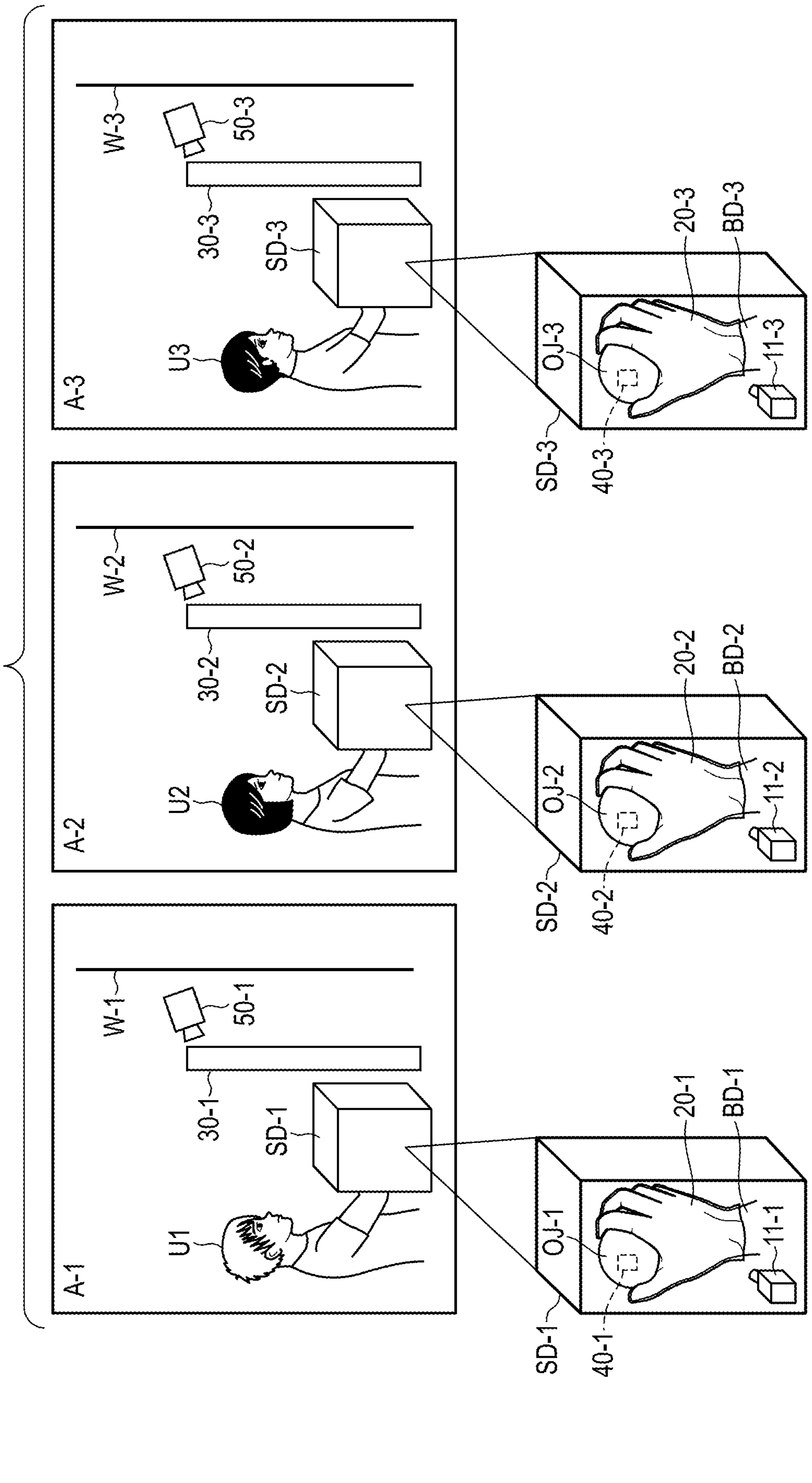
FIG. 26 is a diagram illustrating yet another example of use.

FIG. 26 is a diagram illustrating yet another example of use.

The illustrated example corresponds to a case where the user U1, the user U2, and a user U3 use the system while located in different spaces. The system corresponding to the user U1 and the system corresponding to the user U2 have been described with reference to FIG. 24. The system corresponding to the user U3 is configured in the same manner as the system corresponding to the user U1, and will be simply described below.

In space A-3 where the user U3 is located, a display unit 30-3, a camera 50-3, and a shield (first shield) SD-3 are provided. The camera 50-3 is provided behind the display unit 30-3. As described above, the display unit 30-3 comprises a polymer dispersed liquid crystal panel.

In this example, a right hand of the user U3 corresponds to a specific part BD-3. The haptic presentation unit 20-3 is formed in a glove-like shape and is attached to the specific part BD-3.

The user U3 inserts the specific part BD-3 to which the haptic presentation unit 20-3 is attached into a shield SD-3 and grasps a real object OJ-3. The user U3 cannot visually recognize his/her own specific part BD-3, the haptic presentation unit 20-3, or the real object OJ-3.

The information acquisition unit 11-3 is provided inside the shield SD-3, captures the specific part BD-3 grasping the real object OJ-3 via the haptic presentation unit 20-3, acquires spatial position information of the specific part BD-3, and outputs the information to the arithmetic processing unit.

Figure 27:
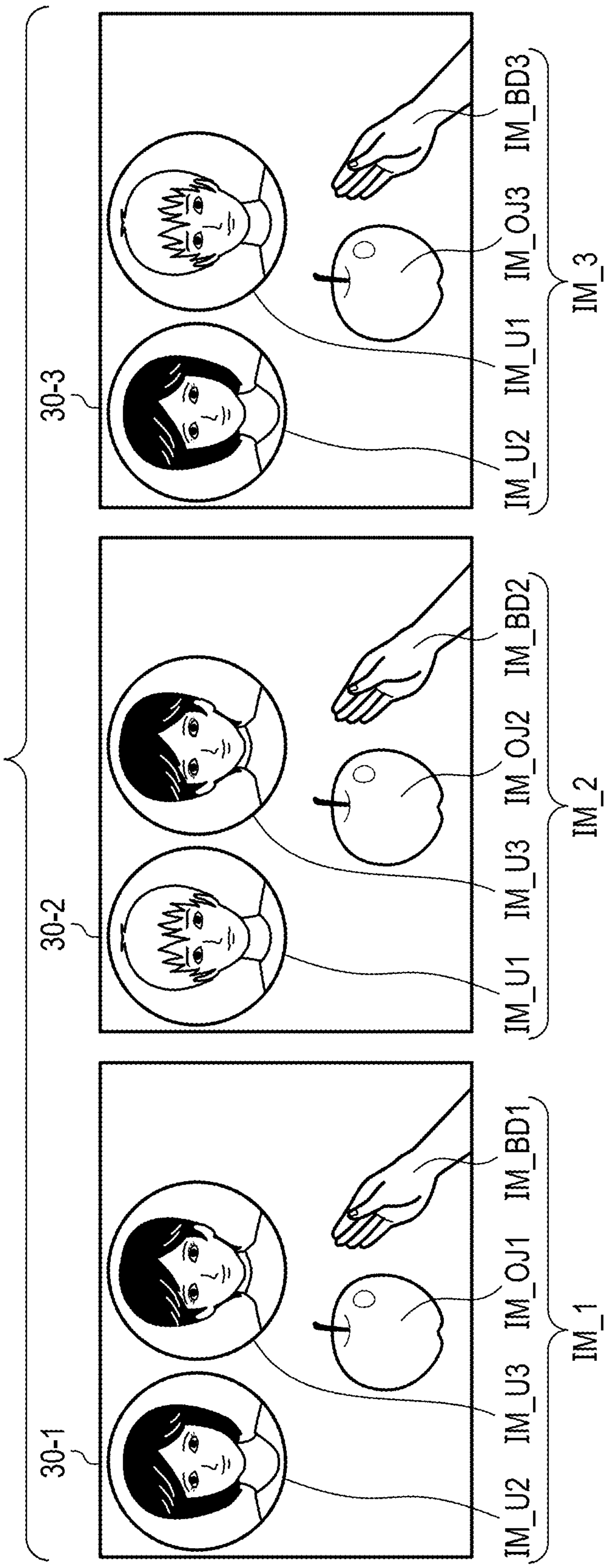
FIG. 27 is a diagram showing an example of each of the image IM_1 displayed on the display unit 30-1, the image IM_2 displayed on the display unit 30-2, and an image IM_3 displayed on a display unit 30-3, shown in FIG. 26.

FIG. 27 is a diagram showing an example of each of the image IM_1 displayed on the display unit 30-1, the image IM_2 displayed on the display unit 30-2, and an image IM_3 displayed on a display unit 30-3, shown in FIG. 26.

A left side of the figure is the image IM_1 on the display unit 30-1 observed by the user U1. The user U1 can observe the background of the display unit 30-1 in the same manner as that described with reference to FIG. 11.

A center of the figure is the image IM_2 on the display unit 30-2 observed by the user U2. The user U2 can observe the background of the display unit 30-2 in the same manner as that described with reference to FIG. 11.

A right side of the figure is the image IM_3 on the display unit 30-3 observed by the user U3. The user U3 can observe the background of the display unit 30-3 in the same manner as that described with reference to FIG. 11.

The example of the image IM_1 is displayed on the display unit 30-1 when the specific part BD-1 of the user U1 grasps the real object OJ-1 via the haptic presentation unit 20-1.

The example of the image IM_2 is displayed on the display unit 30-2 when the specific part BD-2 of the user U2 grasps the real object OJ-2 via the haptic presentation unit 20-2.

The example of the image IM_3 is displayed on the display unit 30-3 when the specific part BD-3 of the user U3 grasps the real object OJ-3 via the haptic presentation unit 20-3.

The image IM_1 includes, for example, an image IM_U2 of the user U2 captured by a camera 50-2, an image IM_U3 of the user U3 captured by a camera 50-3, a hand image which is the simulated specific part image IM_BD1, and an apple image which is the simulated object image IM_OJ1. The specific part image IM_BD1 is a right hand image obtained by simulating the right hand which the user U1 inserts into the shield SD-1, and is observed as a right hand by the user U1. When the user U1 moves the specific part BD-1 while grasping the real object OJ-1, the image IM_1 is displayed on the display unit 30-1 as a moving image in which the specific part image IM_BD1 and the object image IM_OJ1 are displaced to follow the movement of the specific part BD-1.

The image IM_2 includes, for example, an image IM_U1 of the user U1 captured by a camera 50-1, the image IM_U3 of the user U3 captured by the camera 50-3, a hand image which is the simulated specific part image IM_BD2, and an apple image which is the simulated object image IM_OJ2. The specific part image IM_BD2 is a right hand image obtained by simulating the right hand which the user U2 inserts into the shield SD-2, and is observed as a right hand by the user U2. When the user U2 moves the specific part BD-2 while grasping the real object OJ-2, the image IM_2 is displayed on the display unit 30-2 as a moving image in which the specific part image IM_BD2 and the object image IM_OJ2 are displaced to follow the movement of the specific part BD-2.

The image IM_3 includes, for example, the image IM_U1 of the user U1 captured by the camera 50-1, the image IM_U2 of the user U2 captured by the camera 50-2, a hand image which is the simulated specific part image IM_BD3, and an apple image which is the simulated object image IM_OJ3. The specific part image IM_BD3 is a right hand image obtained by simulating the right hand which the user U3 inserts into the shield SD-3, and is observed as a right hand by the user U3. When the user U3 moves the specific part BD-3 while grasping the real object OJ-3, the image IM_3 is displayed on the display unit 30-3 as a moving image in which the specific part image IM_BD3 and the object image IM_OJ3 are displaced to follow the movement of the specific part BD-3.

Incidentally, the object image IM_OJ1, the object image IM_OJ2, and the object image IM_OJ3 are, for example, images of the same apple, but are not limited to this. Alternatively, the object image IM_OJ1, the object image IM_OJ2, and the object image IM_OJ3 may be different from each other.

When the user U1 observes the image IM_1, the user U1 can recognize the specific part image IM_BD1 as his/her own specific part (right hand). At this time, the haptic presentation unit 20-1 is driven to present the the desired haptic sensation in accordance with the haptic information of the object image IM_OJ1 displayed on the display unit 30-1.

When the user U2 observes the image IM_2, the user U2 can recognize the specific part image IM_BD2 as his/her own specific part (right hand). At this time, the haptic presentation unit 20-2 is driven to present the the desired haptic sensation in accordance with the haptic information of the object image IM_OJ2 displayed on the display unit 30-2.

When the user U3 observes the image IM_3, the user U3 can recognize the specific part image IM_BD3 as his/her own specific part (right hand). At this time, the haptic presentation unit 20-3 is driven to present the the desired haptic sensation in accordance with the haptic information of the object image IM_OJ3 displayed on the display unit 30-3.

Therefore, the fusion of the information displayed on the display unit 30-1 with the reality is promoted, and the user U1 can obtain the sensation without an uncomfortable feeling as if the user grasped the same apple as the user U2 and the user U3 grasp in his/her own hand. In addition, the user U1 can make eye contact with the user U2, who faces forward, by observing the image IM_U2, and make eye contact with the user U3, who faces forward, by observing the image IM_U3, and can thereby obtain the sensation of sharing the same haptic sensation.

Furthermore, the other users U2 and U3 can also obtain the same sensation as the user U1.

Incidentally, display formats of the user images (IM_U1, IM_U2, and IM_U3) displayed on the display units may be different depending on the relationships among a plurality of users. It is assumed that, for example, the user U1 is a teacher and that users U2 and U3 are students. The image IM_U2 of the user U2 and the image IM_U3 of the user U3 are displayed on the display unit 30-1. Accordingly, the user U1 can check the circumstance of the users U2 and U3, who are students. The image IM_U1 of the user U1 is displayed on each of the display unit 30-2 and the display unit 30-2. Accordingly, the users U2 and U3 can check the circumstance of the user U1, who is a teacher.

Figure 28:
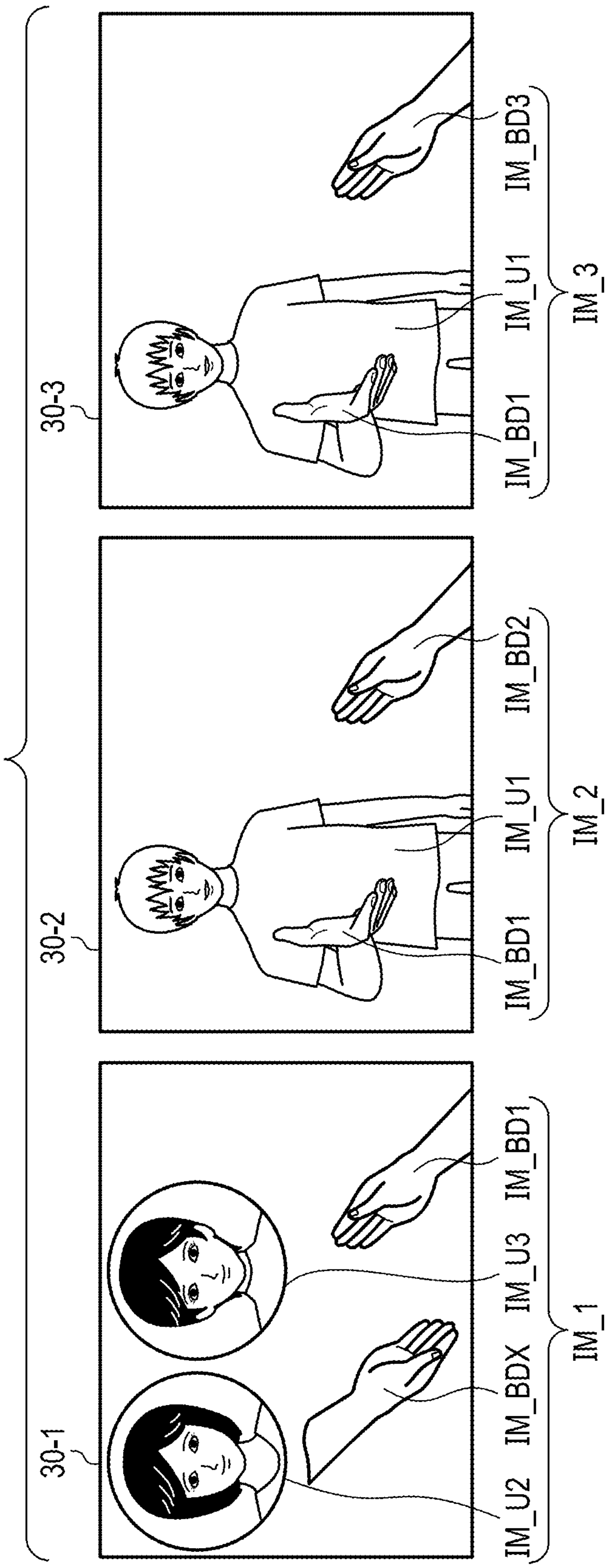
FIG. 28 is a diagram showing another example of each of the image IM_1 displayed on the display unit 30-1, the image IM_2 displayed on the display unit 30-2, and the image IM_3 displayed on the display unit 30-3, shown in FIG. 26.

FIG. 28 is a diagram showing another example of each of the image IM_1 displayed on the display unit 30-1, the image IM_2 displayed on the display unit 30-2, and the image IM_3 displayed on the display unit 30-3, shown in FIG. 26.

A left side of the figure is the image IM_1 on the display unit 30-1 observed by the user U1.

A center of the figure is the image IM_2 on the display unit 30-2 observed by the user U2.

A right side of the figure is the image IM_3 on the display unit 30-3 observed by the user U3.

The image IM_1 includes, for example, an image IM_U2 of the user U2 captured by a camera 50-2, an image IM_U3 of the user U3 captured by a camera 50-3, a hand image which is the simulated specific part image IM_BD1, and a hand image which is the other simulated specific part image IM_BDX. The specific part image IM_BD1 is a right hand image obtained by simulating the right hand which the user U1 inserts into the shield SD-1, and is observed as a right hand by the user U1. When the user U1 moves the specific part BD-1, the image IM_1 is displayed on the display unit 30-1 as a moving image in which the specific part image IM_BD1 is displaced to follow the movement of the specific part BD-1. The specific part image IM_BDX is a right hand image obtained by simulating a right hand, i.e., a specific part which the other user inserts into the shield, and is displaced to follow the movement of the specific part of the other user.

The image IM_2 includes, for example, the image IM_U1 including the specific part image IM_BD1 of the user U1 captured by the camera 50-1, and a hand image which is the simulated specific part image IM_BD2. The specific part image IM_BD2 is a right hand image obtained by simulating the right hand which the user U2 inserts into the shield SD-2, and is observed as a right hand by the user U2. When the user U2 moves the specific part BD-2, the image IM_2 is displayed on the display unit 30-2 as a moving image in which the specific part image IM_BD2 is displaced to follow the movement of the specific part BD-2.

The image IM_3 includes, for example, the image IM_U1 including the specific part image IM_BD1 of the user U1 captured by the camera 50-1, and a hand image which is the simulated specific part image IM_BD3. The specific part image IM_BD3 is a right hand image obtained by simulating the right hand which the user U3 inserts into the shield SD-3, and is observed as a right hand by the user U3. When the user U3 moves the specific part BD-3, the image IM_3 is displayed on the display unit 30-3 as a moving image in which the specific part image IM_BD3 is displaced to follow the movement of the specific part BD-3.

It is assumed here that, for example, the user U1 is an actor and the user U2 and the user U3 are fans, and that the actor remotely shakes hands with a plurality of fans.

The specific part image IM_BDX displayed on the display unit 30-1 is an image of the right hand of either the user U2 or the user U3. The image IM_U1 displayed on the display unit 30-2 and the display unit 30-3 is an image in which the user U1 extends his/her right hand.

When the user U1 shakes hands with the user U2, the specific part image IM_BDX displayed on the display unit 30-1 is displaced to follow the movement of the right hand, which is the specific part of the user U2. In addition, the specific part image IM_BD1 of the image IM_U1 of the user U1 displayed on the display unit 30-2 is displaced to follow the movement of the right hand, which is the specific part of the user U1.

While observing the image IM_1, the user U1 brings his/her own specific part image IM_BD1 close to the specific part image IM_BDX and performs a grasping motion. In addition, while observing the image IM_2, the user U2 brings his/her own specific part image IM_BD2 close to the specific part image IM_BD1 of the image IM_U1 and performs a grasping motion.

At this time, the haptic presentation unit 20-1 of the user U1 is driven to follow the movement of the right hand of the user U2. In addition, the haptic presentation unit 20-2 of the user U2 is driven to follow the movement of the right hand of the user U1. Accordingly, both the user U1 and the user U2 can obtain the sensation of shaking hands without any uncomfortable feeling.

While observing the image IM_U1 of the user U1 displayed on the display unit 30-2, the user U2 can simultaneously observe the background of the display unit 30-2 around these images. Therefore, the user U2 can observe the user U1 as if he/she floated at its place, and can obtain the sensation as if the user U1 were actually present in front of the user U2.

When the user U1 shakes hands with the user U2, the image IM_U1 may not be displayed on the display unit 30-3 or the image of the right hand in the image IM_U1 may be fixed so as not to be displaced.

When the user U1 shakes hands with the user U3, the same control as that in a case where the user U1 shakes hands with the user U2 is performed. Accordingly, both the user U1 and the user U3 can obtain the sensation of shaking hands without any uncomfortable feeling.

Figure 29:
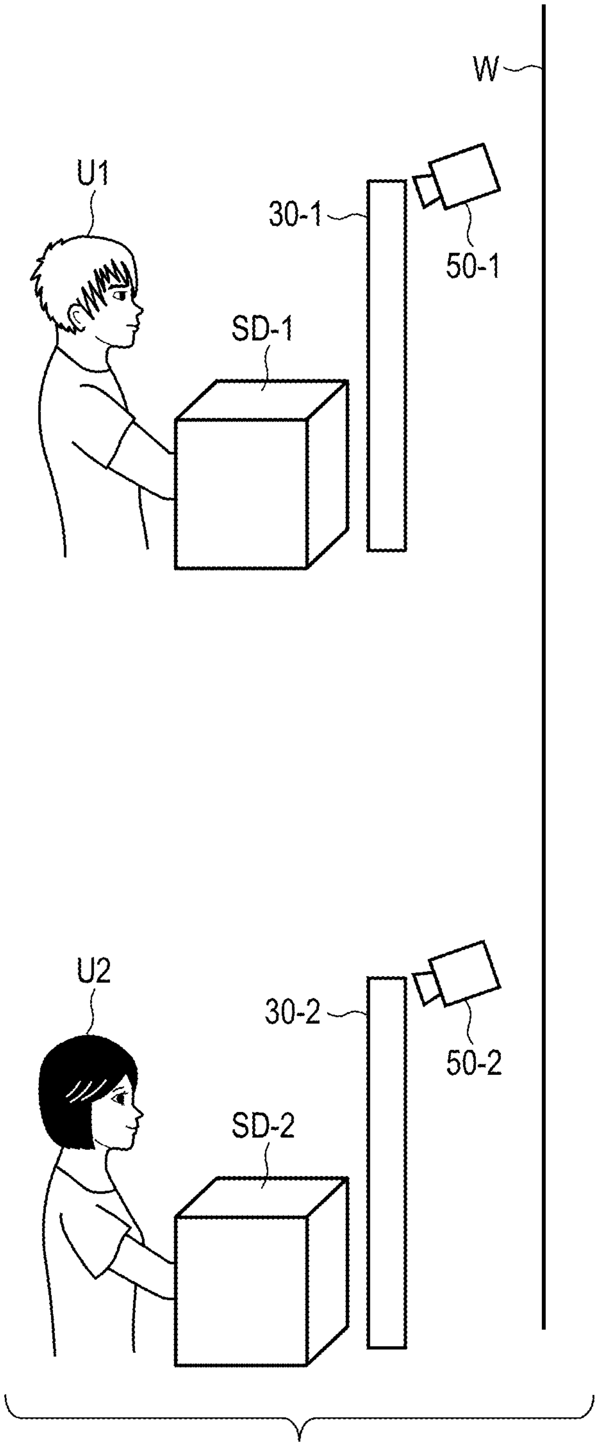
FIG. 29 is a diagram illustrating yet another example of use.

FIG. 29 is a diagram illustrating yet another example of use.

The illustrated example corresponds to a case where the user U1 and the user U2 use the system while located in the same space. The system corresponding to the user U1 and the system corresponding to the user U2 have been described with reference to FIG. 24, but will be simply described below.

In the system corresponding to the user U1, the display unit 30-1, the camera 50-1, and the shield SD-1 are provided in front of the wall W. The camera 50-1 is provided behind the display unit 30-1. As described above, the display unit 30-1 comprises a polymer dispersed liquid crystal panel. Although not described in detail, the right hand, which is the specific part BD-1 of the user U1 wearing the haptic presentation unit 20-1, is inserted into the shield SD-1.

In the system corresponding to the user U2, the display unit 30-2, the camera 50-2, and the shield SD-2 are provided in front of the wall W. The camera 50-2 is provided behind the display unit 30-2. As described above, the display unit 30-2 comprises a polymer dispersed liquid crystal panel. Although not described in detail, the right hand, which is the specific part BD-2 of the user U2 wearing the haptic presentation unit 20-2, is inserted into the shield SD-2.

Figure 30:
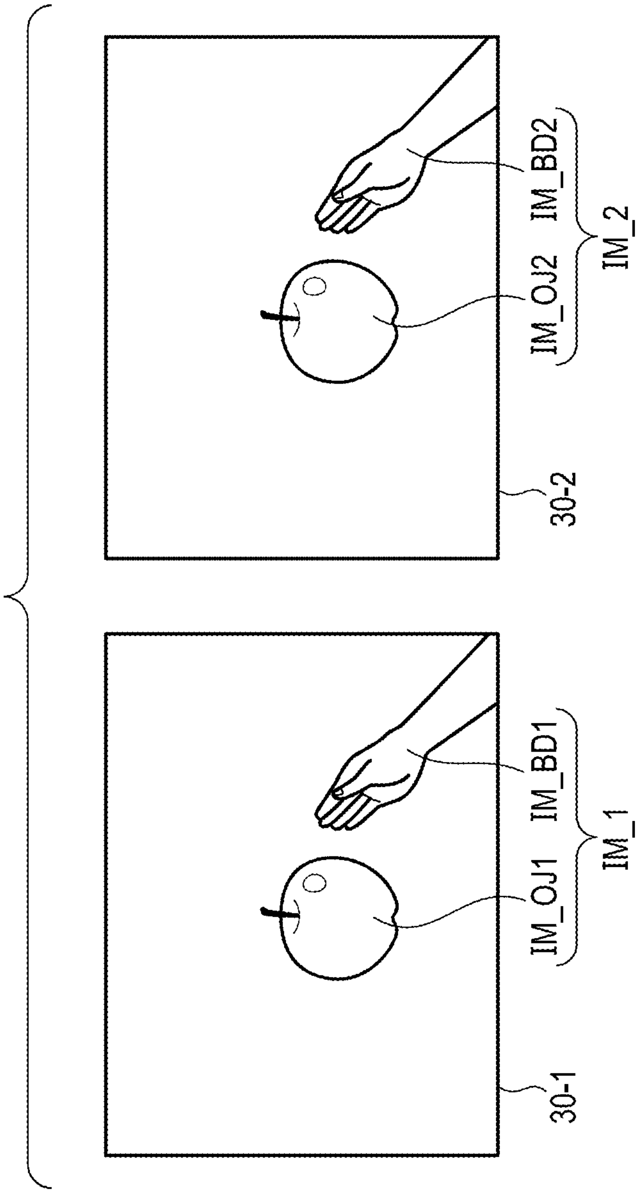
FIG. 30 is a diagram showing an example of each of the image IM_1 displayed on the display unit 30-1 and the image IM_2 displayed on the display unit 30-2 shown in FIG. 29.

FIG. 30 is a diagram showing an example of each of the image IM_1 displayed on the display unit 30-1 and the image IM_2 displayed on the display unit 30-2 shown in FIG. 29.

A left side of the figure is the image IM_1 on the display unit 30-1 observed by the user U1.

A right side of the figure is the image IM_2 on the display unit 30-2 observed by the user U2.

The image IM_1 includes, for example, an image of the hand which is the simulated specific part image IM_BD1, and an image of an apple which is the simulated object image IM_OJ1. The specific part image IM_BD1 is a right hand image obtained by simulating the right hand which the user U1 inserts into the shield SD-1, and is observed as a right hand by the user U1. When the user U1 moves the specific part BD-1, the image IM_1 is displayed on the display unit 30-1 as a moving image in which the specific part image IM_BD1 is displaced to follow the movement of the specific part BD-1.

The image IM_2 includes, for example, an image of the hand which is the simulated specific part image IM_BD2, and an image of an apple which is the simulated object image IM_OJ2. The specific part image IM_BD2 is a right hand image obtained by simulating the right hand which the user U2 inserts into the shield SD-2, and is observed as a right hand by the user U2. When the user U2 moves the specific part BD-2, the image IM_2 is displayed on the display unit 30-2 as a moving image in which the specific part image IM_BD2 is displaced to follow the movement of the specific part BD-2.

When the user U1 observes the image IM_1, the user U1 can recognize the specific part image IM_BD1 as his/her own specific part (right hand). At this time, the haptic presentation unit 20-1 is driven to present the the desired haptic sensation in accordance with the haptic information of the object image IM_OJ1 displayed on the display unit 30-1.

When the user U2 observes the image IM_2, the user U2 can recognize the specific part image IM_BD2 as his/her own specific part (right hand). At this time, the haptic presentation unit 20-2 is driven to present the the desired haptic sensation in accordance with the haptic information of the object image IM_OJ2 displayed on the display unit 30-2.

Therefore, the user U1 and the user U2 who are located in the same space can obtain the sensation without an uncomfortable feeling as if the users grasped the same apple in their own hands while having a conversation with each other.

As described above, the augmented reality presentation system capable of providing a higher sense of reality can be provided according to the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A augmented reality presentation system comprising:

a haptic presentation unit including a first haptic presentation unit mounted on a specific part of a first user, the specific part of the first user being included in a body of the first user, and presenting a haptic sensation to the specific part of the first user, and a second haptic presentation unit mounted on a specific part of a second user, the specific part of the second user being included in a body of the second user, and presenting a haptic sensation to the specific part of the second user, the specific part not being visible to the first user and the second user;

a display unit provided at a position which is visible to the first user and the second user;

an information acquisition unit acquiring spatial position information of the specific part;

an information setting unit setting haptic information corresponding to the haptic sensation; and an arithmetic processing unit generating a specific part image obtained by simulating the specific part, wherein the arithmetic processing unit generates a moving image of the specific part image following a movement of the specific part on a basis of the spatial position information, displays the moving image on the display unit, and drives the haptic presentation unit on a basis of the haptic information.

2. The augmented reality presentation system of claim 1, wherein the arithmetic processing unit generates the moving image in which the specific part image is displaced on a basis of the haptic information.

3. The augmented reality presentation system of claim 2, wherein an amount of displacement of the specific part image in the moving image is different from an amount of displacement of the specific part, an amount of displacement of the specific part image in a first mode presenting a first haptic sensation is smaller than an amount of displacement of the specific part image in a second mode presenting a second haptic sensation softer than the first haptic sensation, and an amount of displacement of the specific part image in a third mode presenting a third haptic sensation is greater than an amount of displacement of the specific part image in a fourth mode presenting a fourth haptic sensation rougher than the third haptic sensation.

4. The augmented reality presentation system of claim 1, wherein the arithmetic processing unit generates the moving image by synthesizing an object image obtained by simulating a real object with the specific part image.

5. The augmented reality presentation system of claim 4, wherein the arithmetic processing unit generates the moving image in which the object image is deformed on a basis of the haptic information.

6. The augmented reality presentation system of claim 5, wherein when the specific part comes into contact with a real object via the haptic presentation unit, an amount of deformation of the object image in the moving image is different from an amount of deformation of the real object, and an amount of deformation of the object image in a first mode presenting a first haptic sensation is smaller than an amount of deformation of the object image in a second mode presenting a second haptic sensation softer than the first haptic sensation.

7. The augmented reality presentation system of claim 1, wherein the display unit is provided on goggles.

8. The augmented reality presentation system of claim 7, wherein the display unit comprises an illumination device and a liquid crystal panel located between the illumination device and the first user's eyes or between the illumination device and the second user's eyes.

9. The augmented reality presentation system of claim 1, wherein the display unit comprises:

a polymer dispersed liquid crystal panel comprising a first substrate, a second substrate facing the first substrate, and a liquid crystal layer held between the first substrate and the second substrate; and a light source unit provided along a side surface of the second substrate.

10. The augmented reality presentation system of claim 9, wherein the arithmetic processing unit generates the moving image by synthesizing an object image obtained by simulating a real object with the specific part image, and the display unit sets an area where the object image and the specific part image are displayed to a scattering state, and sets an area surrounding the object image and the specific part image to a transparent state.

11. The augmented reality presentation system of claim 9, further comprising:

a shield which blocks the specific part from at least one of a first field of view of the first user and a second field of view of the second user.

12. An augmented reality presentation system comprising:

a first haptic presentation unit mounted on a first specific part of a first user and presenting a first haptic sensation to the first specific part;

a first shield which blocks the first specific part from a first field of view of the first user;

a first information acquisition unit acquiring first spatial position information of the first specific part;

a second haptic presentation unit mounted on a second specific part of a second user and presenting a second haptic sensation to the second specific part;

a second shield which blocks the second specific part from a second field of view of the second user;

a second information acquisition unit acquiring second spatial position information of the second specific part;

a first display unit provided at a position which is visible to the first user and the second user and comprising a polymer dispersed liquid crystal panel;

an information setting unit setting haptic information corresponding to at least one of the first haptic sensation and the second haptic sensation; and an arithmetic processing unit generating a specific part image obtained by simulating at least one of the first specific part and the second specific part, wherein the arithmetic processing unit generates a moving image of the specific part image following a movement of the first specific part on a basis of the first spatial position information, displays the moving image on the first display unit, and drives the first haptic presentation unit on a basis of the haptic information.

13. The augmented reality presentation system of claim 12, further comprising:

left and right reversible glasses mounted on the second user.

14. The augmented reality presentation system of claim 12, further comprising:

a second display unit provided at a position which is visible to the first user and the second user, comprising a polymer dispersed liquid crystal panel, and overlapping with the first display unit; wherein the arithmetic processing unit generates a moving image of the specific part image following a movement of the second specific part on a basis of the second spatial position information, displays the moving image on the second display unit, and drives the second haptic presentation unit on a basis of the haptic information.

15. The augmented reality presentation system of claim 12, wherein the first shield and the second shield have an integrated box shape.

16. The augmented reality presentation system of claim 12, further comprising:

a third information acquisition unit capturing a real object, wherein the arithmetic processing unit generates a three-dimensional image as an object image of the real object on a basis of information on the real object and displays the three-dimensional image together with the specific part image on the first display unit, the information on the real object being acquired by the third information acquisition unit.

17. An augmented reality presentation system comprising:

a first haptic presentation unit mounted on a first specific part of a first user and presenting a first haptic sensation to the first specific part;

a first shield which blocks the first specific part from a first field of view of the first user;

a first information acquisition unit acquiring first spatial position information of the first specific part;

a first display unit provided at a position which is visible to the first user and comprising a polymer dispersed liquid crystal panel;

a first camera provided behind the first display unit and capturing the first user via the first display unit;

a second haptic presentation unit mounted on a second specific part of a second user and presenting a second haptic sensation to the second specific part;

a second shield which blocks the second specific part from a second field of view of the second user;

a second information acquisition unit acquiring second spatial position information of the second specific part;

a second display unit provided at a position which is visible to the second user and comprising a polymer dispersed liquid crystal panel;

a second camera provided behind the second display unit and capturing the second user via the second display unit;

a first arithmetic processing unit displaying an image of the second user captured by the second camera on the first display unit, generating a moving image of a first specific part image following a movement of the first specific part on a basis of the first spatial position information, and displaying the moving image on the first display unit; and a second arithmetic processing unit displaying an image of the first user captured by the first camera on the second display unit, generating a moving image of a second specific part image following a movement of the second specific part on a basis of the second spatial position information, and displaying the moving image on the second display unit.

18. The augmented reality presentation system of claim 17, further comprising:

a first information setting unit setting first haptic information corresponding to the first haptic sensation; and a second information setting unit setting second haptic information corresponding to the second haptic sensation, wherein the first arithmetic processing unit drives the first haptic presentation unit on a basis of the first haptic information, and the second arithmetic processing unit drives the second haptic presentation unit on a basis of the second haptic information.

19. The augmented reality presentation system of claim 17, wherein the first arithmetic processing unit displays the moving image of the second specific part image together with the moving image of the first specific part image on the first display unit, and drives the first haptic presentation unit to follow a movement of the second specific part on a basis of the second spatial position information, and the second arithmetic processing unit displays the moving image of the first specific part image together with the moving image of the second specific part image on the second display unit, and drives the second haptic presentation unit to follow a movement of the first specific part on a basis of the first spatial position information.

20. An augmented reality presentation device comprising:

a first haptic presentation unit mounted on a first specific part of a first user and configured to present a first haptic sensation to the first specific part;

a first shield which blocks the first specific part from a first field of view of the first user;

a first information acquisition unit configured to acquire first spatial position information of the first specific part;

a second haptic presentation unit mounted on a second specific part of a second user and configured to present a second haptic sensation to the second specific part;

a second shield which blocks the second specific part from a second field of view of the second user;

a second information acquisition unit configured to acquire second spatial position information of the second specific part;

a first display unit provided at a position which is visible to the first user and the second user and comprising a polymer dispersed liquid crystal panel;

an information setting unit configured to set haptic information corresponding to one of the first haptic sensation and the second haptic sensation; and an arithmetic processing unit configured to generate a specific part image obtained by simulating at least one of the first specific part and the second specific part, wherein the arithmetic processing unit is configured to generate a moving image of the specific part image following a movement of the first specific part on a basis of the first spatial position information, to display the moving image on the first display unit, and to drive the first haptic presentation unit on a basis of the haptic information.

* * * * *